US012210337B2

(12) United States Patent
Yogo et al.

(10) Patent No.: US 12,210,337 B2
(45) Date of Patent: Jan. 28, 2025

(54) OPERATION CONTROL APPARATUS, OPERATION CONTROL METHOD, AND PROGRAM

(71) Applicant: OPTON Co. LTD., Aichi (JP)

(72) Inventors: Teruaki Yogo, Aichi (JP); Haining Lu, Aichi (JP); Toshihiro Kani, Aichi (JP)

(73) Assignee: OPTON Co. LTD., Aichi (JP)

( * ) Notice: Subject to any disclaimer, the term of this patent is extended or adjusted under 35 U.S.C. 154(b) by 365 days.

(21) Appl. No.: 17/864,205

(22) Filed: Jul. 13, 2022

(65) Prior Publication Data

US 2022/0350310 A1  Nov. 3, 2022

Related U.S. Application Data

(63) Continuation of application No. PCT/JP2021/002768, filed on Jan. 27, 2021.

(30) Foreign Application Priority Data

Jan. 28, 2020 (JP) .................... 2020-011386
Apr. 20, 2020 (JP) .................... 2020-075017
Jun. 30, 2020 (JP) .................... 2020-112920

(51) Int. Cl.
*G05B 19/4155* (2006.01)

(52) U.S. Cl.
CPC ............. *G05B 19/4155* (2013.01); *G05B 2219/31368* (2013.01)

(58) Field of Classification Search
CPC ........... G05B 19/4155; G05B 19/4093; G05B 19/4097; G05B 19/05; G05B 19/18;
(Continued)

(56) References Cited

U.S. PATENT DOCUMENTS 5,122,717 A * 6/1992 Hayashi ........... G05B 19/40937
                                                  700/87
10,108,154 B2 * 10/2018 Varadi ................ G05B 13/04
(Continued)

FOREIGN PATENT DOCUMENTS

JP    H3-154105 A    7/1991
JP    H6-250715 A    9/1994
(Continued)

OTHER PUBLICATIONS

Extended European Search Report issued in European Patent Application No. 21747218.2, mailed on Feb. 23, 2024 (9 pages).
(Continued)

*Primary Examiner* — Nicholas Klicos
(74) *Attorney, Agent, or Firm* — Nakanishi IP Associates, LLC

(57) ABSTRACT

A stored control program includes subperiods into which an operation period from a start to an end of an operation of an automated manufacturing machine is divided. Each subperiod is assigned with an actuator to act and action information about the actuator. The subperiods are sequentially selected one by one as a control target, and feedback control is performed on an action of the actuator assigned to the selected subperiod. This reduces the number of actuators controlled at the same time for controlling the operation of an automated manufacturing machine including many actuators. The control program can thus be executed promptly with an operation control apparatus having ordinary processing capability.

6 Claims, 22 Drawing Sheets

(58) Field of Classification Search
CPC .......... G05B 2219/31368; G05B 2219/36243; G05B 2219/36276; G05B 2219/36296; B25J 9/1682

See application file for complete search history.

(56) References Cited

U.S. PATENT DOCUMENTS

| | | | | |
|---|---|---|---|---|
| 2006/0163510 A1* | 7/2006 | Bunyard | ................ | G05B 19/00 251/129.05 |
| 2016/0033962 A1* | 2/2016 | Cote | ................ | G05B 19/41885 700/29 |
| 2016/0059412 A1* | 3/2016 | Oleynik | ................... | B25J 19/02 700/250 |
| 2016/0231733 A1* | 8/2016 | Nagatani | ............ | G05B 19/4097 |
| 2018/0292813 A1* | 10/2018 | Nagata | ............... | G05B 19/4188 |
| 2020/0094411 A1* | 3/2020 | Tan | ........................ | B25J 9/1661 |
| 2021/0162597 A1* | 6/2021 | Klassen | ................ | B25J 9/1651 |

FOREIGN PATENT DOCUMENTS

| | | |
|---|---|---|
| JP | H11-202912 A | 7/1999 |
| JP | 2000-259216 A | 9/2000 |
| JP | 2003-228403 A | 8/2003 |
| JP | 2011-245602 A | 12/2011 |
| JP | 2018-185772 A | 11/2018 |
| JP | 2018-192570 A | 12/2018 |
| WO | 2015/063925 A1 | 5/2015 |

OTHER PUBLICATIONS

International Search Report issued in PCT/JP2021/002768 mailed on Apr. 13, 2021 with English Translation (5 pages).

Written Opinion of International Searching Authority issued in PCT/JP2021/002768 mailed on Apr. 13, 2021 with English Translation (7 pages).

Office Action issued in Japanese Patent Application No. 2020-011386 mailed on May 12, 2020, with English Translation (8 pages).

Office Action issued in Japanese Patent Application No. 2020-075017 mailed on Nov. 24, 2020, with English Translation (8 pages).

Office Action issued in Japanese Patent Application No. 2021-010883 mailed on Mar. 8, 2022, with English Translation (6 pages).

* cited by examiner

FIG. 9

| Action identifier | Actuator | Action | Program element number |
|---|---|---|---|
| Ω-AA | AC servomotor + chuck unit | Opening or closing motion | 3 |
| Ω-AB | AC servomotor + reducer | Rotation motion | 7 |
| Ω-AC | AC servomotor + ball screw unit | Forward or backward motion | 4 |
| Ω-CA | Air cylinder | Forward or backward motion | 2 |

| Numerical table number | 5 |
|---|---|
| Opening-closing speed (mm/s) | 20 |
| Opening-closing load (N) | 15 |

| Numerical table number | 6 |
|---|---|
| Opening-closing speed (mm/s) | -30 |
| Opening-closing load (N) | 5 |

| Numerical table number | 10 |
|---|---|
| Rotation angle (deg) | 90 |
| Rotation speed (deg/s) | 10 |
| Torque (Nm) | 15 |

| Numerical table number | 11 |
|---|---|
| Rotation angle (deg) | -90 |
| Rotation speed (deg/s) | 10 |
| Torque (Nm) | 15 |

FIG. 13

| Actuator | Structure of actuator | Action | Action identifier | Program element number |
|---|---|---|---|---|
| Actuator Ac10 | AC servomotor + chuck unit | Opening or closing motion | Ω-AA | 3 |
| Actuator Ac11 | AC servomotor + reducer | Rotation motion | Ω-AB | 7 |
| Actuator Ac12 | AC servomotor + ball screw unit | Forward or backward motion | Ω-AC | 4 |
| Actuator Ac13 | AC servomotor + ball screw unit | Forward or backward motion | Ω-AC | 4 |
| Actuator Ac14 | Air cylinder | Forward or backward motion | Ω-CA | 2 |
| Actuator Ac15 | Air cylinder | Forward or backward motion | Ω-CA | 2 |
| Actuator Ac16 | AC servomotor + ball screw unit | Forward or backward motion | Ω-AC | 4 |
| Actuator Ac17 | AC servomotor + reducer | Rotation motion | Ω-AB | 7 |
| Actuator Ac17 | AC servomotor + reducer | Rotation motion | Ω-AD | 8 |
| Actuator Ac18 | AC servomotor + reducer | Rotation motion | Ω-AB | 7 |
| Actuator Ac18 | AC servomotor + reducer | Rotation motion | Ω-AD | 8 |
| Actuator Ac19 | AC servomotor + ball screw unit | Forward or backward motion | Ω-AC | 4 |

FIG. 16

Intermediate data

Control program

| Program element number | Action details | Command name | First argument | Second argument | Third argument |
|---|---|---|---|---|---|
| 1 | Opening or closing motion of AC servomotor (with time specified) | ACMTR_OC_wT | 0: Open 1: Close | Opening-closing degree | Time |
| 2 | Forward or backward motion of air cylinder | ARCYL_OC | — | — | — |
| 3 | Opening or closing motion of AC servomotor (without time specified) | ACMTR_OC_woT | 0: Open 1: Close | Opening-closing degree | — |
| 4 | Forward or backward motion of AC servomotor (without time specified) | ACMTR_FR_woT | 0: Forward 1: Backward | Movement distance | — |
| 5 | Forward or backward motion of AC servomotor (with time specified) | ACMTR_FR_wT | 0: Forward 1: Backward | Movement distance | Time |
| 6 | Rotation motion of AC servomotor (with time specified) | ACMTR_RT_wT | 0: Positive 1: Negative | Rotation angle | Time |
| 7 | Rotation motion of AC servomotor, Mode a (without time specified) | ACMTR_RTa_woT | 0: Positive 1: Negative | Rotation angle | — |
| 8 | Rotation motion of AC servomotor, Mode b (without time specified) | ACMTR_RTb_woT | 0: Positive 1: Negative | Rotation angle | — |

FIG. 22A
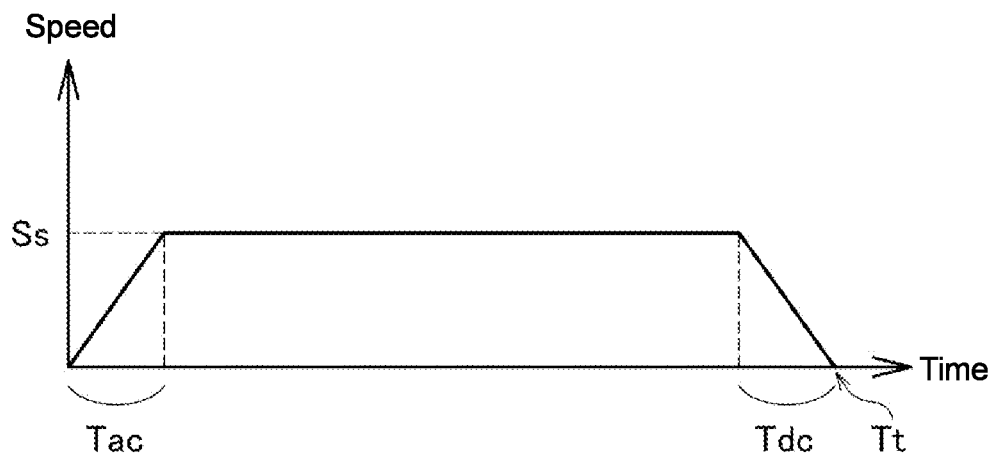
FIG. 22B
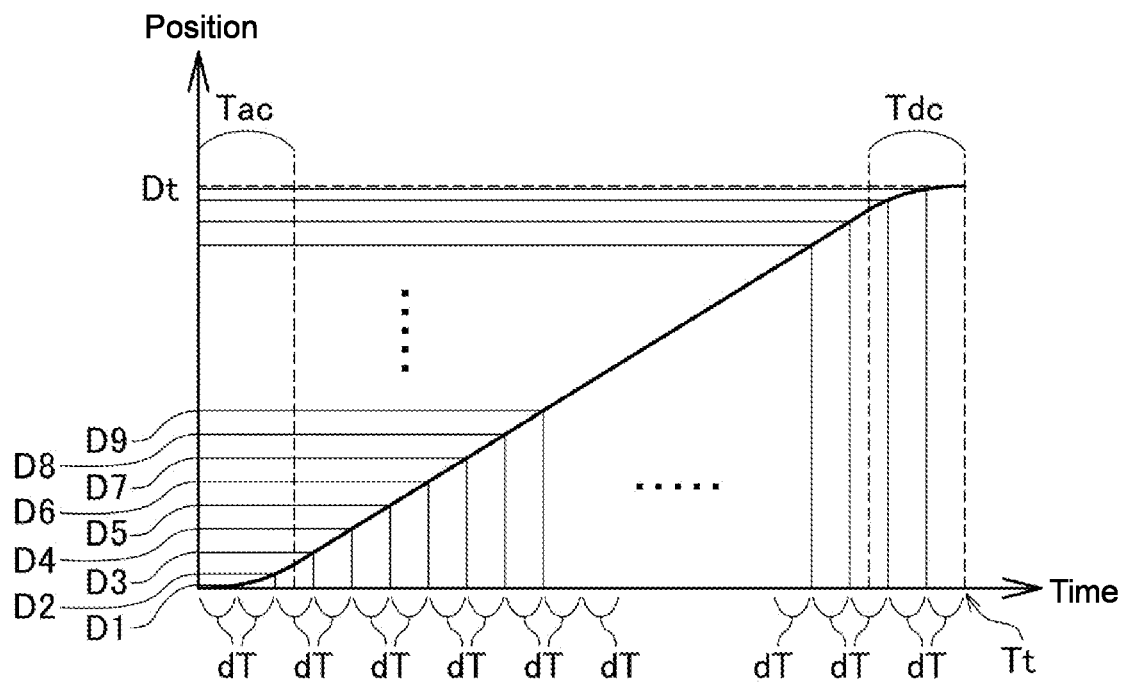
FIG. 22C
(D1, D2, D3, D4, D5, D6, D7, D8, D9, D10, D11, D12,······, Dt)

FIG. 23A
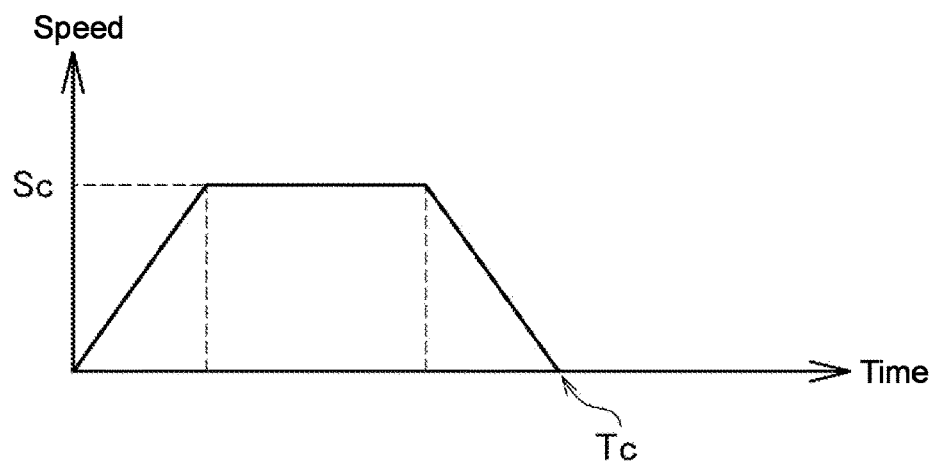
FIG. 23B
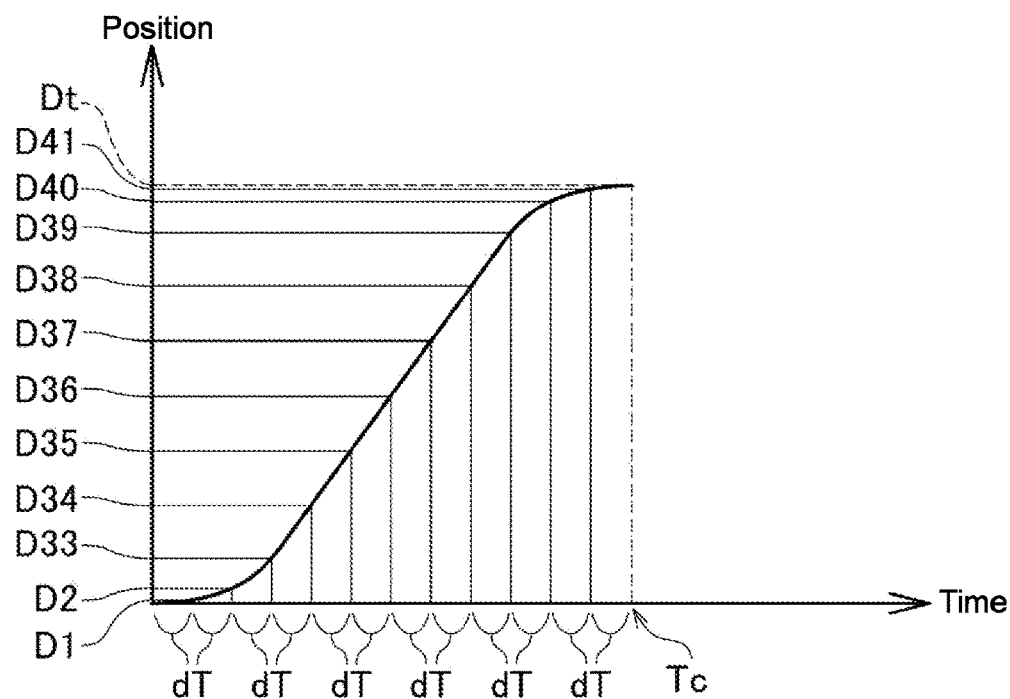
FIG. 23C
(D1, D2, D33, 3D4, D35, D36, D37, D38, D39, D40, D41, Dt)

| | |
|---|---|
| Numerical table number | 10 |
| Rotation angle (deg) | 90 |
| Subsequent-action permission position (deg) | −5 |
| Rotation speed (deg/s) | 10 |
| Torque (Nm) | 15 |

OPERATION CONTROL APPARATUS, OPERATION CONTROL METHOD, AND PROGRAM

CROSS-REFERENCE TO RELATED APPLICATIONS

This application is a continuation application of International Patent Application No. PCT/JP2021/002768 filed on Jan. 25, 2021, which claims priority to Japanese Patent Application No. 2020-011386 filed on Jan. 28, 2020, Japanese Patent Application No. 2020-075017 filed on Apr. 20, 2020, and Japanese Patent Application No. 2020-112920 filed on Jun. 30, 2020, the entire contents of which are incorporated by reference.

BACKGROUND OF INVENTION

Field of the Invention

The present invention relates to a technique for controlling the operation of an automated manufacturing machine including multiple actuators in accordance with a control program.

Background Art

To increase productivity at factories and other manufacturing sites, manufacturing processes are to be automated using automated manufacturing machines. Manufacturing processes include various processes depending on, for example, an object to be machined or manufactured or the type of machining (e.g., cutting or bending). Various automated manufacturing machines have been developed depending on the manufacturing processes to be automated (refer to, for example, Patent Literatures 1 and 2).

Similar manufacturing processes may differ in detail at each manufacturing site. An automated manufacturing machine used at one manufacturing site cannot easily be introduced to another manufacturing site. In many cases, an automated manufacturing machine dedicated to each manufacturing site is to be developed. Developing a dedicated automated manufacturing machine involves newly developing a control program for controlling the automated manufacturing machine.

Developing the control program involves much effort. To increase productivity at manufacturing sites, an automated manufacturing machine is to perform complex operations, or multiple automated manufacturing machines are to be combined into a manufacturing system. This involves more effort to develop the control program. The inventor of the present application and others have developed a technique with which the operation of the automated manufacturing machine is written on a special action chart to automatically generate the control program using the action chart. A patent application has been filed for this technique (Japanese Patent Application Nos. 2020-011386 and 2020-075017). The special action chart uniquely developed by the inventor of the present application may be hereafter referred to as a YOGO chart.

This action chart (YOGO chart) can be created easily by any person with knowledge about the operation of the automated manufacturing machine. Although an automated manufacturing machine includes many actuators, the YOGO chart for the automated manufacturing machine can be created in a short time. For a manufacturing system combining multiple automated manufacturing machines, the YOGO chart for the automated manufacturing machines can be created in a short time. Once the YOGO chart is created, the control program can be created easily.

CITATION LIST

Patent Literature

Patent Literature 1: Japanese Unexamined Patent Application Publication No. 2011-245602
Patent Literature 2: Japanese Unexamined Patent Application Publication No. 2018-192570

SUMMARY OF INVENTION

Technical Problem

Although the control program can be created easily with the above patent-pending technique, the created control program may be difficult to execute. For more actuators to be controlled, a control apparatus is to have higher processing capability to control the actuators. A control apparatus with insufficient processing capability may fail to execute the control program at an intended speed. A manufacturing system including multiple automated manufacturing machines includes more actuators to be controlled. In this case as well, a control apparatus with insufficient processing capability may fail to execute the control program at an intended speed.

In response to the above issue with the known technique, one or more aspects of the present invention are directed to a technique that eliminates difficulty in executing the control program generated from the action chart (YOGO chart).

Solution to Problem

In response to the above issue, an operation control apparatus according to one or more aspects of the present invention is an apparatus described below.

The apparatus is specifically an operation control apparatus (120) for an automated manufacturing machine (10, 20, 30) including a plurality of actuators. The operation control apparatus (120) controls an operation of the automated manufacturing machine by causing the plurality of actuators to operate in accordance with a prestored control program. The operation control apparatus (120) includes a control program storage (121), a control target subperiod selector (123), a control-detail extractor (124), and a controller (127). The control program storage (121) stores operation data as the control program. The operation data describes the operation of the automated manufacturing machine and includes a plurality of subperiods into which an operation period from a start to an end of the operation of the automated manufacturing machine is divided. Each of the plurality of subperiods is assigned with an actuator of the plurality of actuators to act and action information about the actuator. The control target subperiod selector (123) selects one of the plurality of subperiods as a control target subperiod. The control-detail extractor (124) extracts, from the control program, a control target actuator being an actuator of the plurality of actuators to be controlled in the control target subperiod and control target action information being the action information about the control target actuator. The controller (127) performs feedback control on an action of the control target actuator to cause the control target actuator to act in accordance with the control target action information. Upon completion of the feedback control on the control target actuator assigned to a current control target subperiod, the control target subperiod selector newly selects, as the control target subperiod, a subperiod of the plurality of subperiods subsequent to the current control target subperiod.

An operation control method according to one or more aspects of the present invention corresponding to the above operation control apparatus is a method described below.

The method is specifically an operation control method for an operation control apparatus (120) to control an operation of an automated manufacturing machine (10, 20, 30) including a plurality of actuators. The operation control method is implementable to control the operation of the automated manufacturing machine by causing the plurality of actuators to act in accordance with a prestored control program. The method includes loading (STEP 50) the control program, selecting (STEP 51, STEP 63) one of the plurality of subperiods, extracting (STEP 52 to STEP 55) a control target actuator and control target action information, and performing (STEP 59) feedback control. The control program describes the operation of the automated manufacturing machine and includes a plurality of subperiods into which an operation period from a start to an end of the operation of the automated manufacturing machine is divided. Each of the plurality of subperiods is assigned with an actuator of the plurality of actuators to act and action information about the actuator. The selecting (STEP 51, STEP 63) one of the plurality of subperiods includes selecting (STEP 51, STEP 63) one of the plurality of subperiods as a control target subperiod. The extracting (STEP 52 to STEP 55) the control target actuator and the control target action information includes extracting (STEP 52 to STEP 55), from the control program, a control target actuator being an actuator of the plurality of actuators to be controlled in the control target subperiod and control target action information being the action information about the control target actuator. The performing (STEP 59) feedback control includes performing (STEP 59) feedback control on an action of the control target actuator to cause the control target actuator to act in accordance with the control target action information. The selecting the control target subperiod includes newly selecting, as the control target subperiod, a subperiod of the plurality of subperiods subsequent to a current control target subperiod upon completion of the feedback control on the control target actuator assigned to the current control target subperiod.

The operation control apparatus and the operation control method according to one or more aspects of the present invention perform control using the control program described below. The control program describes the operation of the automated manufacturing machine. The control program includes subperiods into which an operation period of the automated manufacturing machine is divided. Each subperiod is assigned with an actuator to act and action information about the actuator. For controlling the operation of the automated manufacturing machine, the subperiods are sequentially selected one by one as a control target, and the actuator assigned to the selected subperiod and the action information about the actuator are extracted from the control program. Feedback control is performed on the action of the extracted actuator to cause the actuator to perform the action in accordance with the extracted action information. This reduces the number of actuators controlled at the same time for controlling the operation of an automated manufacturing machine including many actuators. Thus, the control program can be executed at a speed sufficient for practical use with the operation control apparatus having ordinary processing capability.

In the operation control apparatus according to the above aspect of the present invention, the control program storage may store the control program including the plurality of subperiods each assigned with an actuator of the plurality of actuators less than or equal in number to a predetermined assignable number.

This restricts the number of actuators to be controlled at the same time to less than or equal to the predetermined assignable number. The control program can thus be executed at a speed sufficient for practical use without the operation control apparatus having high processing capability.

In the operation control apparatus according to the above aspect of the present invention, the stored control program may include, as the action information about the actuator assigned to the subperiod, an action target value for the actuator and information for generating an action to be performed halfway before the action target value is reached (in other words, an intermediate action). In response to the control target subperiod being selected, control target action information may be extracted to generate the intermediate action for the control target actuator. The control target action information may include the action target value assigned to the control target subperiod and information for generating the intermediate action. The feedback control may be performed on an action of the control target actuator to cause the control target actuator to reach the action target value in accordance with the intermediate action.

This allows the actuator to be controlled to reach an intended action target value through an intended intermediate action. The automated manufacturing machine can thus be controlled more appropriately.

In the operation control apparatus according to the above aspect of the present invention, the feedback control may be performed on the action of the control target actuator with the method described below. First, an intermediate target value may be calculated. The intermediate target value may be a value at a predetermined time interval before the control target actuator reaches the action target value through the intermediate action. The action of the control target actuator may be detected at the predetermined time interval. The feedback control may be performed on the action of the control target actuator to cause the detection value to match the intermediate target value.

The predetermined time interval may be set to a small value to allow accurate control on the action of the actuator.

The above operation control method according to one or more aspects of the present invention may also be implemented as a non-transitory computer-readable storage medium storing a program for causing a computer included in the operation control apparatus to implement the operation control method. The program according to one or more aspects of the present invention is specifically a program for an operation control apparatus (120) to control an operation of an automated manufacturing machine (10, 20, 30) including a plurality of actuators. The program causes a computer included in the operation control apparatus to implement an operation control method to control the operation of the automated manufacturing machine by causing the plurality of actuators to act in accordance with a prestored control program. The program causes the computer to perform operations including loading (STEP 50) the control program, selecting (STEP 51, STEP 63) one of the plurality of subperiods, extracting (STEP 52 to STEP 55) a control target actuator and control target action information, and performing (STEP 59) feedback control. The control program describes the operation of the automated manufacturing machine and includes a plurality of subperiods into which an operation period from a start to an end of the operation of the automated manufacturing machine is divided. Each of the plurality of subperiods is assigned with an actuator of the plurality of actuators to act and action information about the actuator. The selecting (STEP 51, STEP 63) one of the plurality of subperiods includes selecting (STEP 51, STEP 63) one of the plurality of subperiods as a control target subperiod. The extracting (STEP 52 to STEP 55) the control target actuator and the control target action information includes extracting (STEP 52 to STEP 55), from the control program, a control target actuator being an actuator of the plurality of actuators to be controlled in the control target subperiod and control target action information being the action information about the control target actuator. The performing (STEP 59) feedback control includes performing (STEP 59) feedback control on an action of the control target actuator to cause the control target actuator to act in accordance with the control target action information. The selecting the control target subperiod includes newly selecting, as the control target subperiod, a subperiod of the plurality of subperiods subsequent to a current control target subperiod upon completion of the feedback control on the control target actuator assigned to the current control target subperiod.

The program can be loaded and executed by the computer in the operation control apparatus. This allows the control program to be executed at a speed sufficient for practical use without the operation control apparatus having high processing capability.

BRIEF DESCRIPTION OF THE DRAWINGS

FIG. 9 is a table including action identifiers 206a of various element actions written on the YOGO chart 200.

FIGS. 10A and 10B are example numerical tables 206b each combined with the action identifier 206a (Ω-AA).

FIGS. 11A and 11B are example numerical tables 206b each combined with the action identifier 206a (Ω-AB).

FIG. 13 is a table including actuators, action identifiers 206a, and program element numbers stored in a manner associated with one another.

FIG. 16 is a diagram of example intermediate data resulting from the YOGO chart analysis process.

FIG. 17 is a diagram of an example control program resulting from conversion of the intermediate data.

FIG. 21 is a table storing commands in a manner associated with various program element numbers P.

FIGS. 22A, 22B, and 22C are graphs and a diagram showing a numerical string of intermediate target values generated in accordance with a command.

FIGS. 23A, 23B, and 23C are graphs and a diagram showing a numerical string of intermediate target values generated in accordance with a command.

FIG. 24 is an example numerical table 206b in a first modification including a condition for determining an element action to be complete.

DETAILED DESCRIPTION

A. Apparatus Structure

A-1. Overview of Manufacturing System 1

Figure 1:
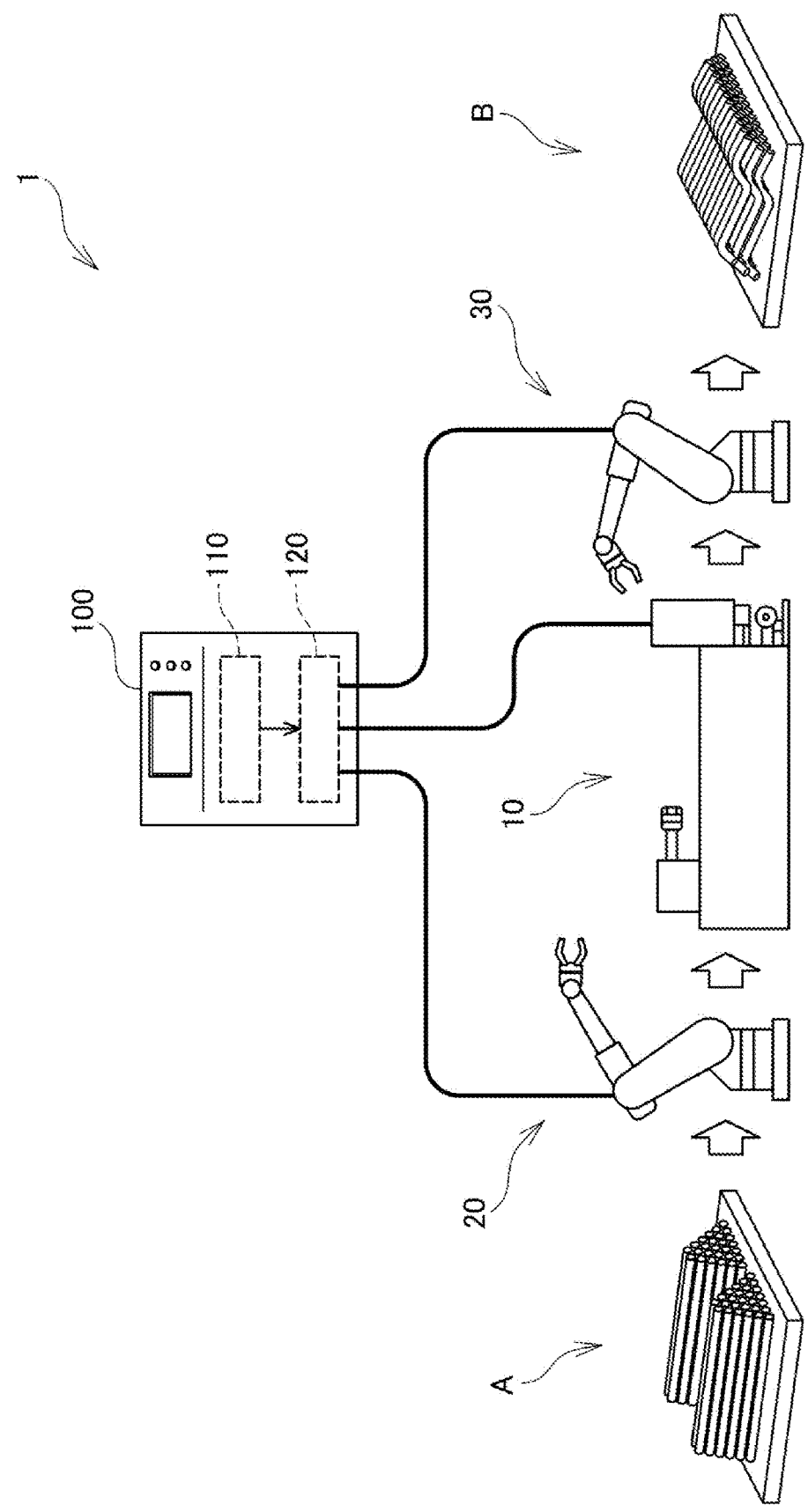
FIG. 1 is a diagram of an example manufacturing system 1 to be controlled by an operation control apparatus 120 according to an embodiment.

FIG. 1 is a diagram of an example manufacturing system 1 for manufacturing finished products B in a predetermined shape by bending pipe materials A. As illustrated, the manufacturing system 1 includes a robotic arm 20 for gripping pipe materials A placed in a storage space and setting the pipe materials A on a pipe bender 10, the pipe bender 10 for bending the set pipe materials A, and a robotic arm 30 for gripping finished products B resulting from bending performed by the pipe bender 10 and placing the finished products B in a storage space. The pipe bender 10 and the robotic arms 20 and 30 are connected to the central control apparatus 100.

The central control apparatus 100 incorporates a control program generation apparatus 110 and an operation control apparatus 120. The control program generation apparatus 110 generates a control program for controlling the operations of the pipe bender 10 and the robotic arms 20 and 30 and outputs the control program to the operation control apparatus 120. The operation control apparatus 120 controls the operations of the pipe bender 10 and the robotic arms 20 and 30 in accordance with the control program.

The robotic arms 20 and 30 and the pipe bender 10 in the present embodiment each correspond to an automated manufacturing machine according to one or more aspects of the present invention. However, the automated manufacturing machine is not limited to the robotic arm 20 or 30 or the pipe bender 10. More specifically, the automated manufacturing machine according to one or more aspects of the present invention can correspond to any manufacturing machine that includes multiple actuators and automatically performs multiple operations such as holding, conveying, machining, or heating objects.

A-2. Overview of Robotic Arms 20 and 30

Figure 2:
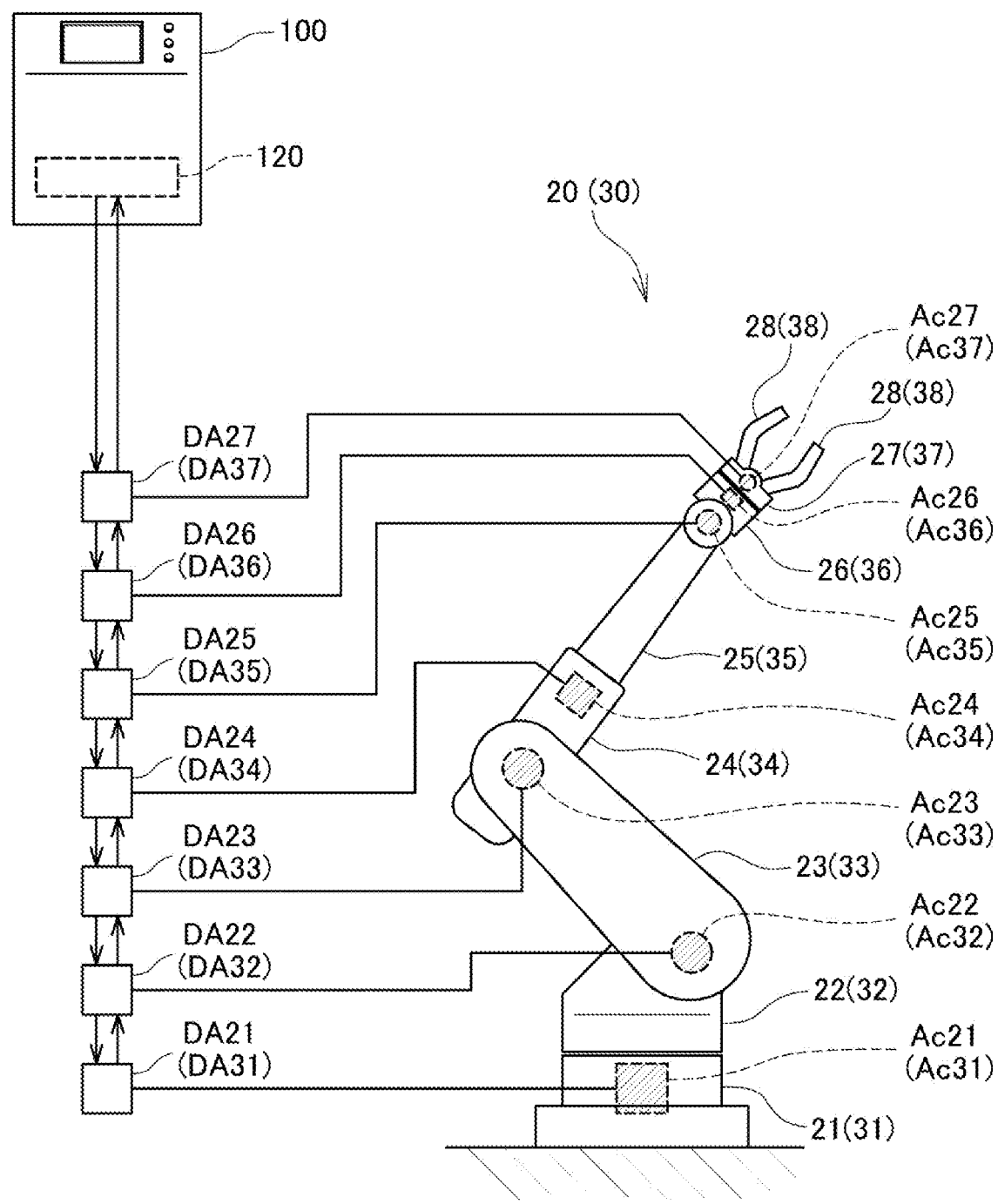
FIG. 2 is a diagram of robotic arms 20 and 30 included in the manufacturing system 1, showing the general structure.

FIG. 2 is a diagram of the robotic arm 20 and the robotic arm 30 included in the manufacturing system 1, showing the general structure. FIG. 2 shows multiple actuators included in each of the robotic arm 20 and the robotic arm 30 and connected to the operation control apparatus 120. Each of the robotic arm 20 and the robotic arm 30 in FIG. 2 is a typical six-axis robotic arm with a gripper connected to its distal end for gripping objects. The robotic arm 20 and the robotic arm 30 in the present embodiment have the same structure. The robotic arm 20 is described herein, with the same applying to the robotic arm 30. In FIG. 2, the robotic arm 20 includes parts indicated by the reference signs without parentheses. The robotic arm 30 includes parts indicated by the reference signs in parentheses adjacent to the reference signs for the robotic arm 20.

As shown in FIG. 2, the robotic arm 20 (30) in the present embodiment includes a base 21 (31) installed on the floor, a body 22 (32) linked to the base 21 (31), a first arm 23 (33) linked to the body 22 (32), a second arm 24 (34) linked to the first arm 23 (33), a third arm 25 (35) linked to the second arm 24 (34), a fourth arm 26 (36) linked to the third arm 25 (35), and a palm 27 (37) linked to the fourth arm 26 (36). The robotic arm 20 (30) further includes two grippers 28 (38) protruding from the palm 27 (37) and facing each other. The body 22 (32) is rotatably linked to the base 21 (31). The first arm 23 (33) is pivotably linked to the body 22 (32). Rotation herein refers to one member turning in a twisted manner relative to the other member. Pivoting herein refers to one member turning in a folded manner relative to the other member. The second arm 24 (34) is pivotably linked to the first arm 23 (33). The third arm 25 (35) is rotatably linked to the second arm 24 (34). The fourth arm 26 (36) is pivotably linked to the third arm 25 (35). The palm 27 (37) is rotatably linked to the fourth arm 26 (36).

The base 21 (31) incorporates an actuator Ac21 (Ac31) that is drivable to cause the body 22 (32) to rotate relative to the base 21 (31). The joint between the body 22 (32) and the first arm 23 (33) incorporates an actuator Ac22 (Ac32) that is drivable to cause the first arm 23 (33) to pivot relative to the body 22 (32). The joint between the first arm 23 (33) and the second arm 24 (34) incorporates an actuator Ac23 (Ac3) that is drivable to cause the second arm 24 (34) to pivot relative to the first arm 23 (33). The second arm 24 (34) incorporates an actuator Ac24 (Ac34) that is drivable to cause the third arm 25 (35) to rotate relative to the second arm 24 (34).

The joint between the third arm 25 (35) and the fourth arm 26 (36) incorporates an actuator Ac25 (Ac35) that is drivable to cause the fourth arm 26 (36) to pivot relative to the third arm 25 (35). The fourth arm 26 (36) incorporates an actuator Ac26 (Ac36) that is drivable to cause the palm 27 (37) to rotate relative to the fourth arm 26 (36). The palm 27 (37) incorporates an actuator Ac27 (Ac37) that is drivable to cause the two grippers 28 (38) protruding from the palm 27 (37) to move toward or away from each other depending on the driving direction. The robotic arm 20 (30) in the present embodiment includes servomotors as the actuators Ac21 to Ac27 (Ac31 to Ac37). However, the actuators are not limited to servomotors but may be, for example, stepper motors that operate with another scheme.

The actuator Ac21 (Ac31) is connected to and driven by a driver amplifier DA21 (DA31). Driver amplifiers are components with the functions below. Actuators are driven on currents conforming to the driving schemes and the standards of the actuators. Actuators to perform the same action may have different drive current values or different current types depending on the types or the manufacturers of the actuators. Actuators thus typically have dedicated driver amplifiers. The driver amplifiers generate currents conforming to the driving schemes and the standards of the actuators to drive the actuators at their respective levels input into the driver amplifiers.

The actuators other than the actuator Ac21 (Ac31) are each connected to a driver amplifier. More specifically, as shown in FIG. 2, the actuator Ac22 (Ac32) is connected to and driven by a driver amplifier DA22 (DA32). The actuators Ac23 to Ac27 (Ac33 to Ac37) are respectively connected to and driven by the driver amplifiers DA23 to DA27 (DA33 to DA37).

The driver amplifiers DA21 to DA27 (DA31 to DA37) are connected in series with one another. The driver amplifier at one end (the driver amplifier DA27 (DA37) in the illustrated example) is connected to the operation control apparatus 120 in the central control apparatus 100. The driver amplifier at one end (the driver amplifier DA27 (DA37) in the illustrated example) is thus directly connected to the operation control apparatus 120, and the driver amplifiers other than this driver amplifier are connected to the operation control apparatus 120 with the other driver amplifiers. However, any other connection structure may be used. For example, the driver amplifiers DA23 to DA27 (DA33 to DA37) may each be directly connected to the operation control apparatus 120.

As described in detail later, the operation control apparatus 120 performs feedback control on the operations of the driver amplifiers DA21 to DA27 (DA31 to DA37) to cause the members (e.g., the body 22 (32), the first arm 23 (33), and the second arm 24 (34)) to be driven by the actuators Ac21 to Ac27 (Ac31 to Ac37) toward their target positions. More specifically, the actuators Ac21 to Ac27 (Ac31 to Ac37) incorporate encoders (not shown) to detect rotational positions. The driver amplifiers DA21 to DA27 (DA31 to DA37) also transmit, to the operation control apparatus 120, information about the rotational positions detected by the encoders incorporated in the actuators Ac21 to Ac27.

A-3. Overview of Pipe Bender 10

Figure 3:
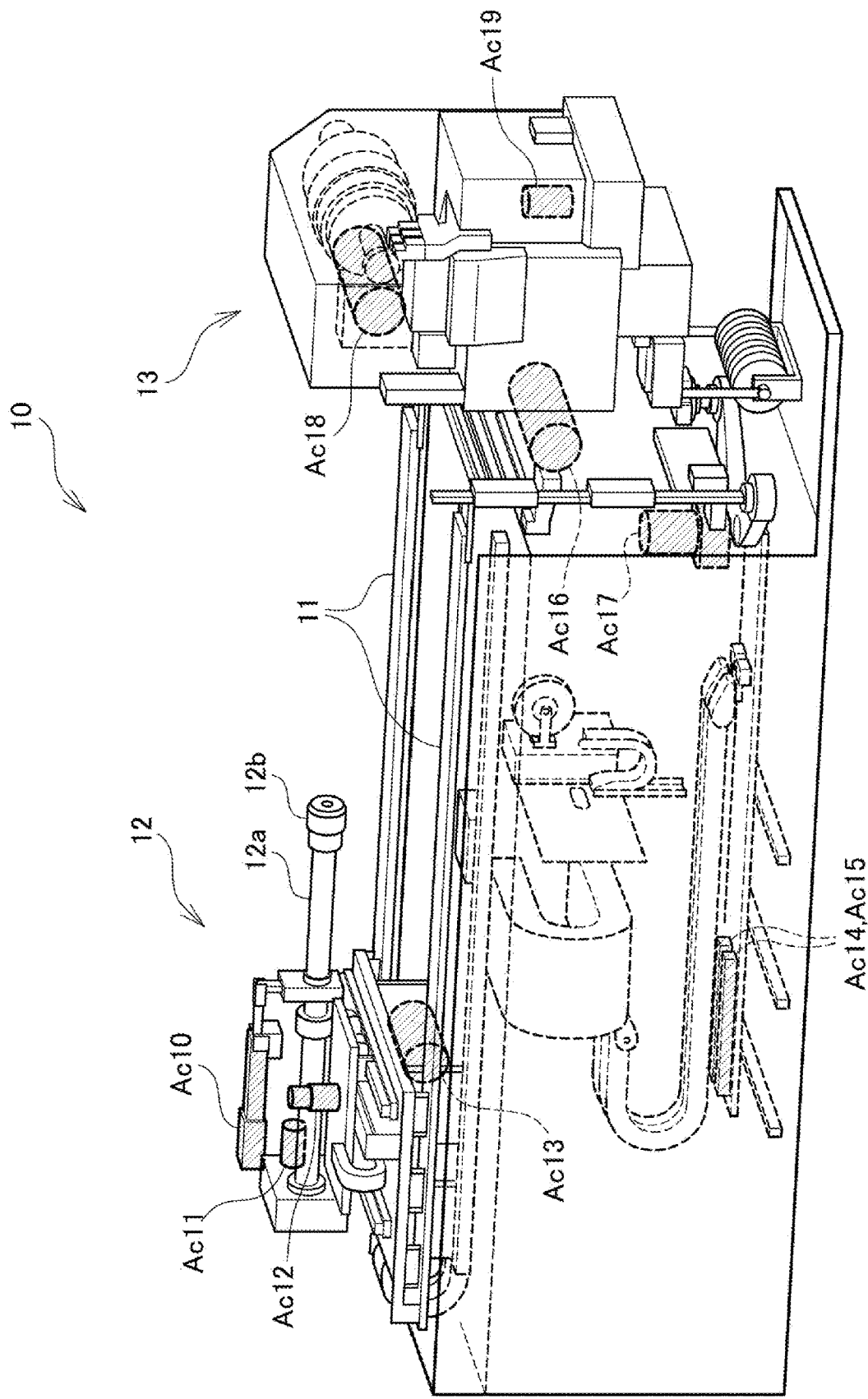
FIG. 3 is a diagram of a pipe bender 10 included in the manufacturing system 1, showing the general structure.

FIG. 3 is a diagram of the pipe bender 10 included in the manufacturing system 1, showing the general structure. As described above, the pipe bender 10 bends the pipe materials A that are long into finished products B in a predetermined shape.

As shown in FIG. 3, the pipe bender 10 in the present embodiment is substantially in the shape of a horizontal rectangular prism. The pipe bender 10 includes two rails 11 extending lengthwise over the upper surface of the rectangular prism. The pipe bender 10 includes a conveyor unit 12 for holding and conveying a pipe material A (not shown) at one end (left in FIG. 3) of the rails 11. The pipe bender 10 includes a machining unit 13 at the end opposite to the conveyor unit 12. The machining unit 13 bends the pipe material A. The conveyor unit 12 includes a protruding cylindrical holder shaft 12a with a chuck 12b attached to its distal end for holding the material A (not shown). The conveyor unit 12 is moved on the rails 11 with the chuck 12b holding the material A to supply the material A to the machining unit 13, which can then bend the material A.

The pipe bender 10 in the present embodiment can control the movement distance of the conveyor unit 12 and thus the conveying distance of the material A. The position on the material A to be bent can thus be controlled as appropriate. The holder shaft 12a with the chuck 12b can be turned (twisted) about its axis to bend the pipe material A in an intended direction. To achieve the above operations, the conveyor unit 12 includes an actuator Ac10 for opening and closing the chuck 12b, an actuator Ac11 for turning the holder shaft 12a, an actuator Ac12 for axially moving the holder shaft 12a forward or backward, and an actuator Ac13 for moving the conveyor unit 12 forward or backward on the rails 11. In the pipe bender 10 in the present embodiment, the actuators Ac10 to Ac13 are all servomotors operable on alternating current power. However, the pipe bender 10 may include actuators with other driving schemes (e.g., hydraulic cylinders, solenoids, or stepper motors) as appropriate for the intended performance of the actuators. The conveyor unit 12 also includes sensors such as encoders and limit switches for detecting the rotational position of the holder shaft 12a and the movement position of the conveyor unit 12. Such sensors are not shown in FIG. 3 to avoid complexity in the figure.

The machining unit 13 includes an actuator Ac16 for bending the pipe material A, an actuator Ac17 for changing the position on the pipe material A to which a force is applied for bending the pipe material A, an actuator Ac18 for vertically moving the entire machining unit 13, and an actuator Ac19 for forming a flat end surface (or a flange) or an annular protrusion (or a bulge) on the pipe material A. The machining unit 13 also includes switches and sensors such as contact switches and encoders. The switches and sensors are not shown to avoid complexity in the figure. The machining unit 13 includes multiple driver amplifiers for driving the above actuators Ac10 to Ac13 and Ac16 to Ac19. The driver amplifiers are also not shown in FIG. 3.

As shown in FIG. 3, the space below the two rails 11 accommodates various machine parts. The space accommodates electrical cables (not shown) for supplying drive currents from the multiple driver amplifiers (not shown) in the machining unit 13 to the actuators Ac10 to Ac13 in the conveyor unit 12, and signal cables (not shown) for transmitting signals from the switches and sensors in the conveyor unit 12 to the machining unit 13. The electrical cables and the signal cables move in the space as the conveyor unit 12 moves forward or backward on the rails 11, possibly being entangled or caught on any component. To avoid such a situation, the space below the rails 11 also accommodates actuators Ac14 and Ac15. For the electrical cables and the signal cables having any unintended play, the actuators Ac14 and Ac15 can pull the cables to eliminate the play. For the electrical cables and the signal cables being tensioned with a strong force, the actuators Ac14 and Ac15 loosen the cables to provide appropriate play. In the pipe bender 10 in the present embodiment, the actuators Ac14 and Ac15 are air cylinders operable under control by the operation control apparatus 120 with driver amplifiers (not shown).

Figure 4:
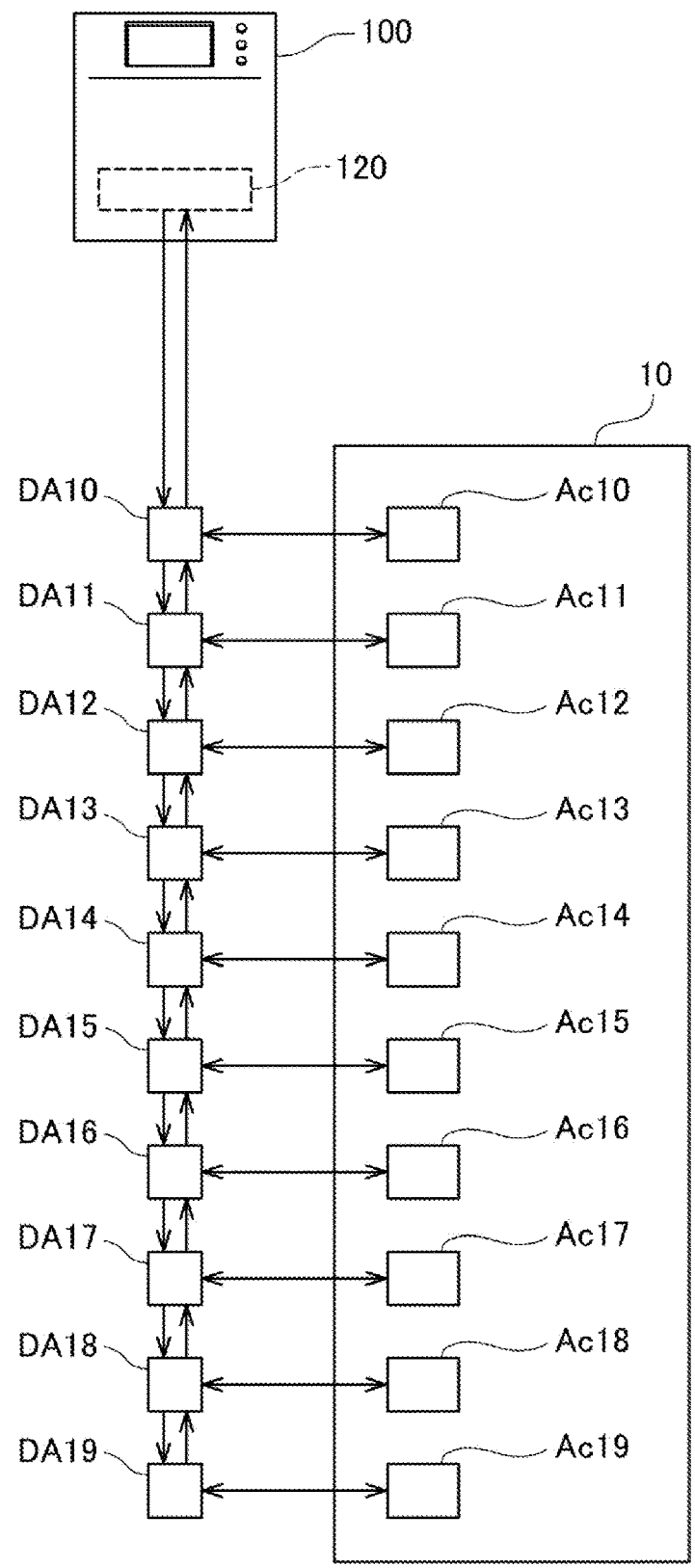
FIG. 4 is a diagram of multiple actuators Ac10 to Ac19 included in the pipe bender 10 and connected to the operation control apparatus 120 according to the present embodiment with driver amplifiers DA10 to DA19.

FIG. 4 is a diagram of multiple actuators Ac10 to Ac19 included in the pipe bender 10 and connected to the operation control apparatus 120 with the driver amplifiers DA10 to DA19. The actuator Ac10 is connected to and driven by the driver amplifier DA10. The actuator Ac11 is connected to and driven by the driver amplifier DA11. Similarly, the actuators Ac12 to Ac19 are connected to and driven by the driver amplifiers DA12 to DA19. The driver amplifiers DA10 to DA19 are connected in series with one another. The driver amplifier at one end (the driver amplifier DA10 in the illustrated example) is connected to the operation control apparatus 120 in the central control apparatus 100. The driver amplifier at one end (the driver amplifier DA10 in the illustrated example) is thus directly connected to the operation control apparatus 120, and the driver amplifiers other than this driver amplifier are connected to the operation control apparatus 120 with the other driver amplifiers. However, any other connection structure may be used. For example, the driver amplifiers DA10 to DA19 may each be directly connected to the operation control apparatus 120.

As described above, the operation control apparatus 120 in the central control apparatus 100 is connected to the driver amplifiers DA21 to DA27 for the robotic arm 20, the driver amplifiers DA10 to DA19 for the pipe bender 10, and the driver amplifiers DA31 to DA37 for the robotic arm 30 (refer to FIGS. 2 and 4). The operation control apparatus 120 controls the actions of the actuators Ac10 to Ac19, Ac21 to Ac27, and Ac31 to Ac37 with the driver amplifiers DA10 to DA19, DA21 to DA27, and DA31 to DA37.

To control the actions of the actuators Ac10 to Ac19, Ac21 to Ac27, and Ac31 to Ac37, a control program to run on the operation control apparatus 120 is to be created. Creating the control program involves more effort than creating the hardware such as the robotic arms 20 and 30 and the pipe bender 10. For a manufacturing system including many actuators to be controlled as in the manufacturing system 1 in the present embodiment, in particular, creating the control program involves still more effort.

The inventor of the present application has developed a technique for automatically generating the control program, for which a patent application has been filed. With the patent-pending technique, a special action chart referred to as a YOGO chart is used to describe the operation of the automated manufacturing machine including multiple actuators. The action chart includes element actions of the actuators (the actuators Ac10 to Ac19, Ac21 to Ac27, and Ac31 to Ac37 herein) included in the operation of the automated manufacturing machine (the robotic arms 20 and 30 and the pipe bender 10 herein). This allows automatic generation of the control program from the YOGO chart with the mechanism described later. The control program can thus be created easily for many actuators to be controlled as in the manufacturing system 1 in the present embodiment.

To control the actions of many actuators, the operation control apparatus 120 is to have high processing capability. For many actuators to be controlled as in the manufacturing system 1 in the present embodiment, the operation control apparatus 120 with insufficient processing capability may fail to execute the control program at an intended speed. Although the control program can be created easily, the manufacturing system 1 or the automated manufacturing machine may be difficult to control. The operation control apparatus 120 according to the present embodiment executes the control program automatically generated from the YOGO chart with the method described later. The method allows the control program to be executed with lower processing capability. The manufacturing system 1 or the automated manufacturing machine including many actuators can be controlled without the operation control apparatus 120 having particularly high processing capability. The method for executing the control program performed by the operation control apparatus 120 according to the present embodiment will now be described. For easy understanding, the principle of automatically generating the control program from the YOGO chart will be described first. The principle is used to further describe the principle on which the operation control apparatus 120 according to the present embodiment can execute the control program with lower processing capability. The processing details will then be described.

B. Overview of Method for Creating YOGO Chart and Controlling Operation of Automated Manufacturing Machine

B-1. Principle of Automatically Generating Control Program from YOGO Chart

Figure 5A:
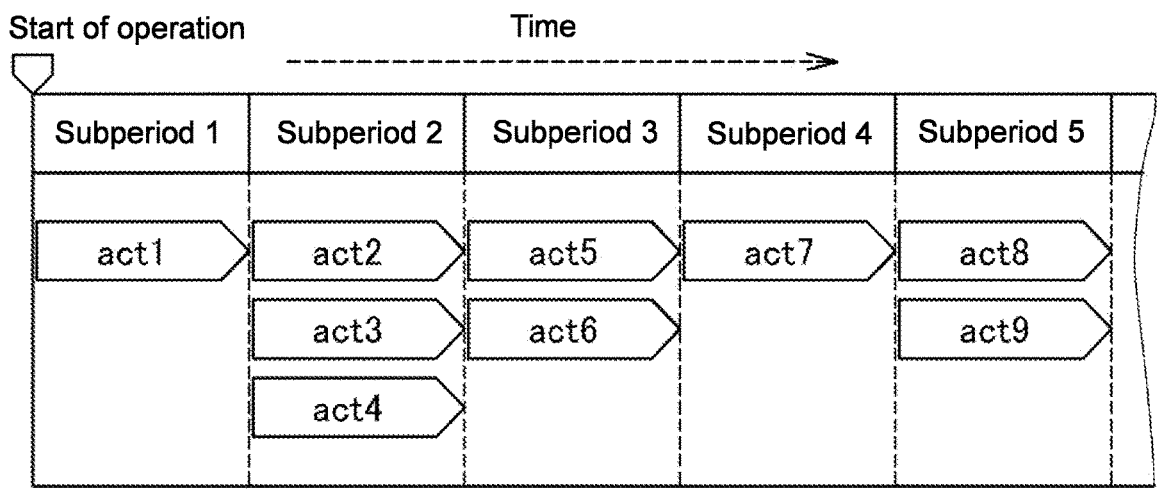
FIGS. 5A and 5B are diagrams showing the basic principle of executing a control program for more actuators without increasing the processing capability to be used.
Figure 5B:
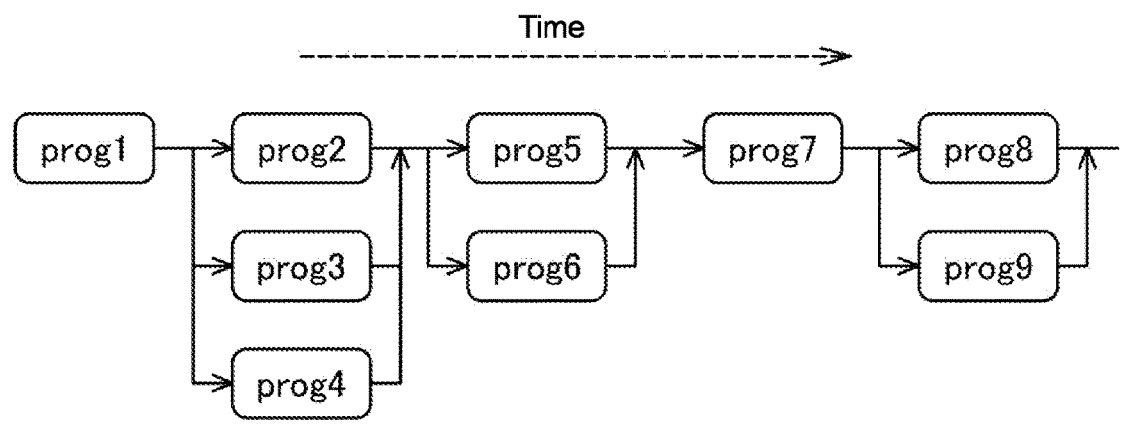

FIGS. 5A and 5B are diagrams showing the principle of automatically generating a control program for the automated manufacturing machine (the pipe bender 10 or the robotic arm 20 or 30 herein) based on the special action chart referred to as the YOGO chart. FIG. 5A is a primitive YOGO chart before undergoing various improvements. The YOGO chart in the present embodiment (described later) is an improvement on the primitive YOGO chart of FIG. 5A. However, the YOGO chart in the present embodiment uses the same principle as the primitive YOGO chart for automatically generating the control program. For easy understanding, the primitive YOGO chart of FIG. 5A is used to describe the principle of automatically generating the control program from the YOGO chart.

The automated manufacturing machine typically includes multiple actuators and operates using the actions of the actuators. The YOGO chart describes the operation of the automated manufacturing machine by combining element actions of the actuators included in the automated manufacturing machine. The element action of each actuator herein refers to the motion of the actuator in the direction of the inherent degree of freedom. For a rotary actuator such as a motor, for example, the element action is a rotation motion. For an actuator that moves forward or backward such as a cylinder, the element action is a forward or backward motion. For an actuator that rotates a ball screw with a motor to move a member engaged with the ball screw forward or backward, the element action is either the rotation motion of the motor or the forward or backward motion of the member. The element action of each actuator is thus a simple motion in the direction of the inherent degree of freedom of the actuator by a specified displacement.

The YOGO chart includes multiple subperiods into which the operation period from the start to the end of the operation of the automated manufacturing machine is divided. The element action of each actuator is assigned to a selected one of the subperiods. In the example of FIG. 5A, the first subperiod (subperiod 1) at the start of the operation of the automated manufacturing machine is assigned with an element action act1 of an actuator. The subsequent subperiod (subperiod 2) is assigned with an element action act2, an element action act3, and an element action act4 (to be performed by one or more actuators that are the same as or different from the actuator for the subperiod 1). The subsequent subperiod (subperiod 3) is assigned with an element action act5 and an element action act6. The subsequent subperiod (subperiod 4) is assigned with an element action act7. The subsequent subperiod (subperiod 5) is assigned with an element action act8 and an element action act9.

A series of actions to be performed by the actuators can thus be described. More specifically, the element action act1 of an actuator starts first. Upon completion of the element action act1, the element action act2, the element action act3, and the element action act4 of the corresponding actuators start. Upon completion of these element actions, the element action act5 and the element action act6 start. Upon completion of these element actions, the element action act7 starts. Upon completion of the element action act7, the element action act8 and the element action act9 start. Such a series of actions can be described. The YOGO chart thus describes the operation of the automated manufacturing machine by assigning the element actions of the actuators included in the automated manufacturing machine to any of the subperiods.

As described above, each subperiod is the period for which the assigned actuator is to operate, rather than the length of the period. For example, the subperiod 1 has a length of time taken for the element action act1. The subperiod 2 has a length of time being the longest one of the length of time taken for the element action act2, the length of time taken for the element action act3, and the length of time taken for the element action act4. The subperiods thus typically have different lengths.

The element actions of the actuators assigned to the subperiods are simple actions, such as rotating a motor by a predetermined angle or moving a cylinder forward or backward by a predetermined distance. The element actions of the actuators can thus be performed with small programs (hereafter, program elements) that can be pre-created. For example, a program element prog1 can be pre-created to cause an actuator to perform the element action act1. Program elements prog2 to prog9 can also be pre-created to respectively perform the element actions act2 to act9.

These program elements can be combined together in accordance with the description of the primitive YOGO chart shown in FIG. 5A to automatically generate the control program to cause the automated manufacturing machine to operate. More specifically, as shown in FIG. 5B, the program element prog1 is first activated. Upon completion of the program element prog1, the program elements prog2 to prog4 are activated. Upon completion of the program elements prog2 to prog4, the program elements prog5 and prog6 are activated. Upon completion of the program elements prog5 and prog6, the program element prog7 is activated. Upon completion of the program element prog7, the program elements prog8 and prog9 are activated. In this manner, program elements to cause actuators to perform element actions are pre-created. The program elements are combined together to be activated sequentially in the order defined by the YOGO chart. This allows automatic generation of the control program to cause the automated manufacturing machine to operate from the YOGO chart.

B-2. Principle of Executing Control Program with Lower Processing Capability As described above, the YOGO chart includes the element actions of the actuators assigned to the subperiods (refer to FIG. 5A). The control program generated from the YOGO chart includes the program elements corresponding to the element actions to be executed in the order of the subperiods assigned with the element actions (refer to FIG. 5B). For an automated manufacturing machine including many actuators, actuators to be controlled are the actuators having their element actions assigned to the current target subperiod. This restricts the number of actuators controlled at the same time.

Figure 6A:
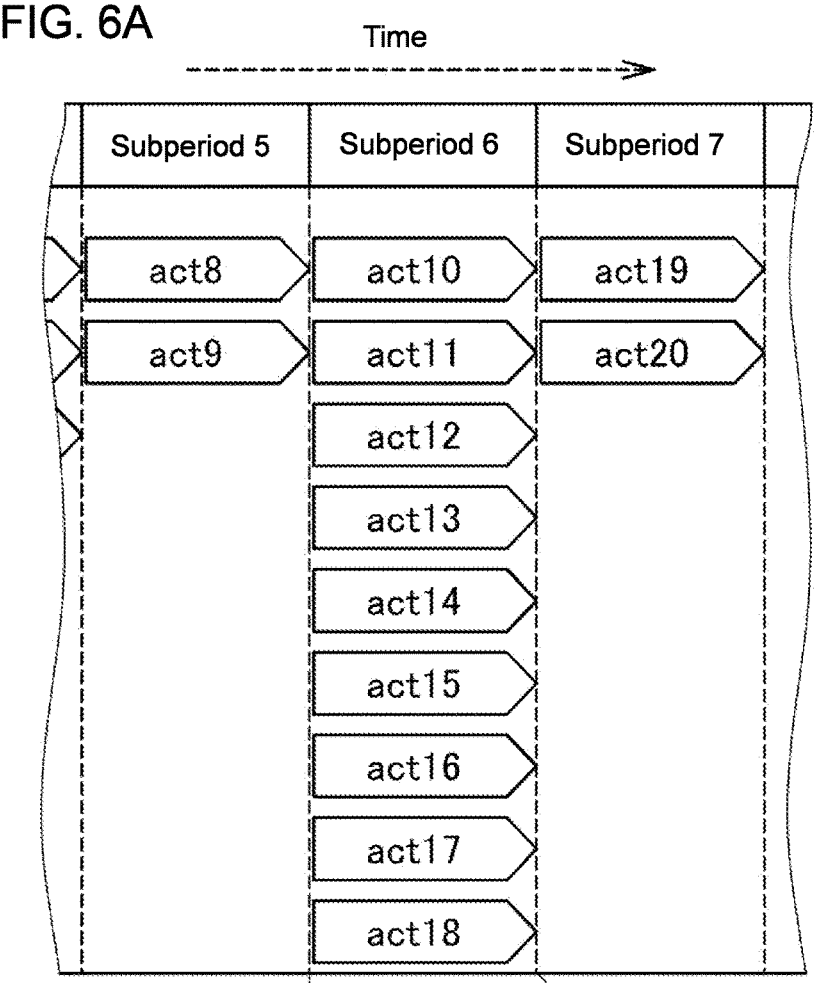
FIGS. 6A and 6B are diagrams supplementarily showing the basic principle of executing a control program without increasing the processing capability to be used.

The YOGO chart may include a subperiod assigned with far more element actions than the other subperiods. In the example of FIG. 6A, a subperiod 6 is assigned with as many as nine element actions act10 to act18. The subperiod assigned with many element actions (e.g., the subperiod 6 in FIG. 6A) may use far more actuators to undergo action control than in the other subperiods.

However, the element actions act10 to act18 assigned to the subperiod 6 in FIG. 6A may not be performed at the same time. The YOGO chart simply defines the nine element actions act10 to act18 to be performed after completion of the element actions assigned to the subperiod 5 and before the start of the element actions assigned to the subperiod 7, rather than the nine element actions act10 to act18 to be performed at the same time.

Figure 6B:
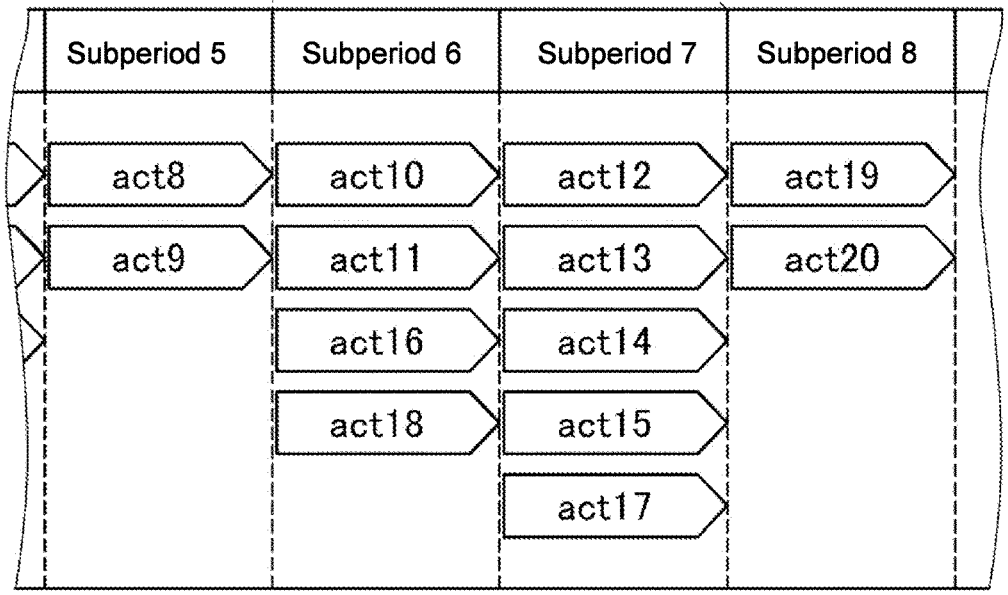

The subperiod assigned with the nine element actions act10 to act18 can be divided into multiple subperiods. The YOGO chart of FIG. 6B includes a subperiod 6 and a subperiod 7 resulting from dividing the subperiod 6 in FIG. 6A. The nine element actions act10 to act18 assigned to the subperiod 6 in FIG. 6A are distributed to either the subperiod 6 or the subperiod 7 in FIG. 6B as appropriate.

The YOGO chart can be useful to predefine actuators assigned to the subperiods in a distributed manner. The control program generated from the YOGO chart includes program elements to be executed to control the actions of the actuators for each subperiod. This restricts the number of program elements executed at the same time. Because the individual program elements are used to perform individual element actions of actuators, the individual program elements can be executed using low processing capability. Thus, the control program for the automated control machine including many actuators can be executed at a speed sufficient for practical use with the operation control apparatus 120 having ordinary processing capability.

Any subperiod assigned with many element actions on the YOGO chart described above may be divided into multiple subperiods by an engineer who creates the YOGO chart. In some embodiments, the number of element actions assignable to each subperiod (assignable number) may be predetermined. When a YOGO chart created by an engineer includes a subperiod assigned with element actions greater in number than the assignable number, the subperiod may be divided automatically.

Figure 7A:
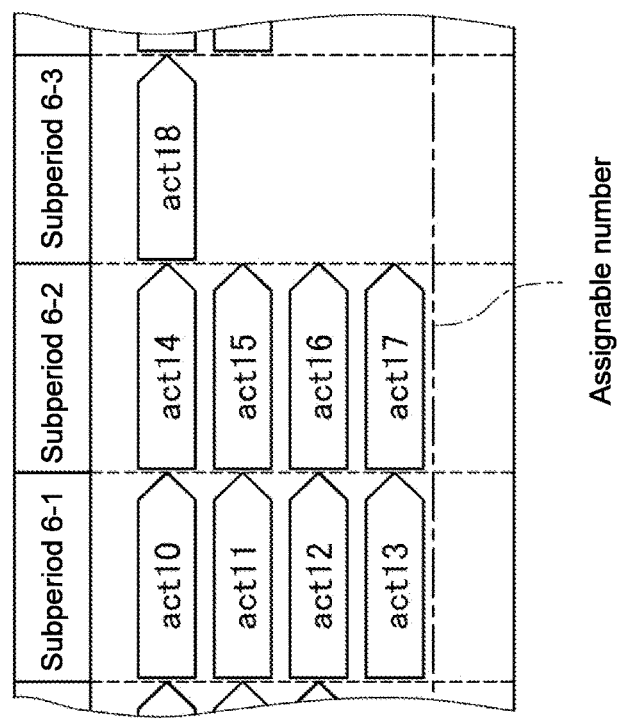
FIGS. 7A, 7B, and 7C are diagrams showing a method for automatically correcting a YOGO chart to include subperiods each assigned with element actions less than or equal in number to an assignable number.

In the example of FIG. 7A, the number of element actions assigned to the subperiod 6 exceeds the assignable number set to 4. The subperiod 6 is divided into two subperiods, a subperiod 6-1 and a subperiod 6-2. The element actions act10 to act13 from the first to the assignable number in the subperiod 6 are assigned to the subperiod 6-1. The other element actions act14 to act18 are assigned to the subperiod 6-2.

Figure 7B:
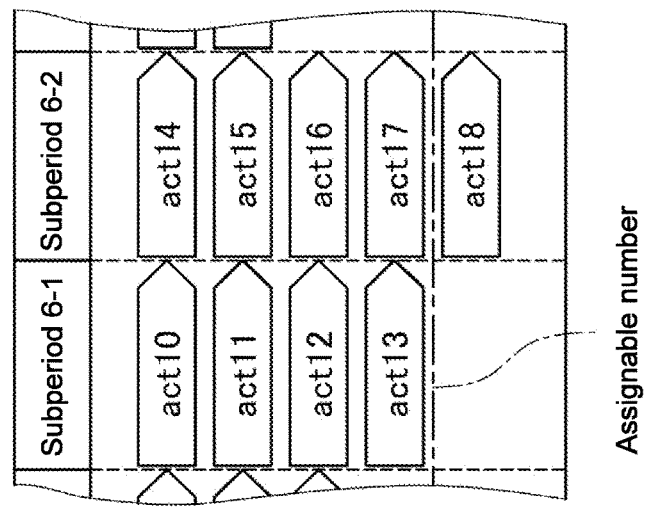
Figure 7C:
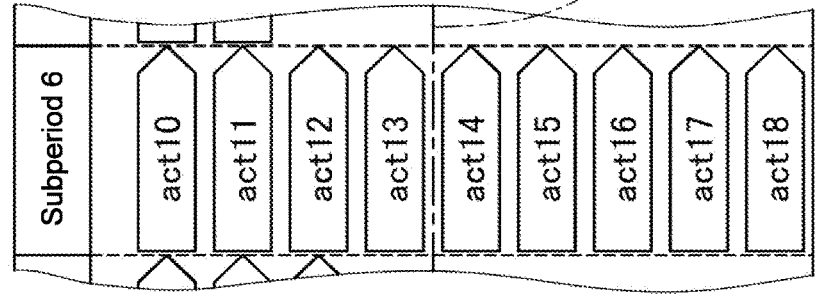

FIG. 7B shows the subperiod 6-1 and the subperiod 6-2 resulting from dividing the subperiod 6. As shown in FIG. 7B, the subperiod 6-1 is assigned with element actions less than or equal in number to the assignable number. However, the subperiod 6-2 is assigned with element actions greater in number than the assignable number. The subperiod 6-2 is divided into two subperiods (a subperiod 6-2 and a subperiod 6-3). The subperiod 6 in FIG. 7A is thus divided into three subperiods. The element actions act14 to act17 from the first to the assignable number in the subperiod 6-2 are assigned to the subperiod 6-2 after the division. The other element action act18 is assigned to the subperiod 6-3. As shown in FIG. 7C, the three subperiods 6-1 to 6-3 resulting from dividing the subperiod 6 are each assigned with element actions less than or equal in number to the assignable number.

With the above method, the YOGO chart created by an engineer can be corrected automatically by a computer to include the subperiods each assigned with element actions less than or equal in number to the assignable number. The control program generated from the YOGO chart can thus be executed promptly with the operation control apparatus 120 having ordinary processing capability.

C. Method for Automatically Generating Control Program from YOGO Chart

The method for automatically generating the control program from the YOGO chart will now be described in detail. The YOGO chart will first be described specifically. The primitive YOGO chart described above with reference to FIG. 5A has been improved variously to be the YOGO chart described below.

C-1. Overview of YOGO Chart

Figure 8:
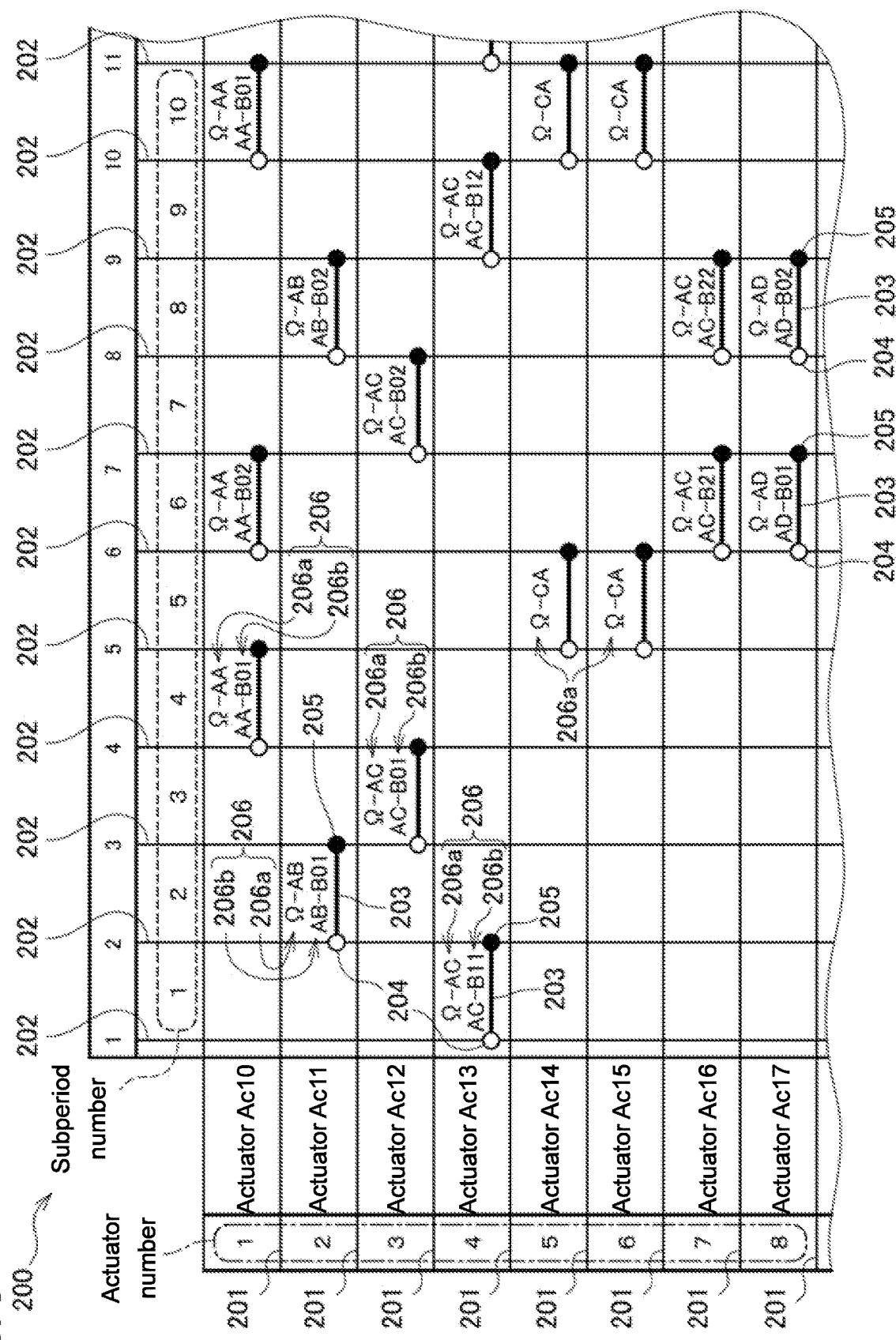
FIG. 8 is an example partial YOGO chart 200 readable by a control program generation apparatus 110 according to the present embodiment.

FIG. 8 schematically shows a YOGO chart 200 in the present embodiment. The YOGO chart 200 of FIG. 8 describes the operation of the pipe bender 10 shown in FIG. 3. The chart can be similarly created for the robotic arm 20 and the robotic arm 30 shown in FIG. 2. FIG. 8 shows a part (the upper left corner) of the YOGO chart 200 to avoid scaling down and showing the entire chart being unreadable. As shown in FIG. 8, the YOGO chart 200 is a large table with multiple horizontal lines and multiple vertical lines intersecting with each other. The horizontal lines of the multiple intersecting lines are referred to as separation lines 201, and the vertical lines are referred to as trigger lines 202.

The trigger lines 202 are given serial numbers starting with number 1. In the example of FIG. 8, the trigger lines 202 have their serial numbers written in the top field of the YOGO chart 200. Each area defined by adjacent trigger lines 202 corresponds to the subperiod described above with reference to FIGS. 5A and 5B. The subperiods are also given serial numbers (hereafter, subperiod numbers) starting with 1. For the YOGO chart 200 of FIG. 8, the trigger lines 202 are drawn in the vertical direction, and thus the subperiods defined by the trigger lines 202 are arranged in the horizontal direction. However, the trigger lines 202 may be drawn in the horizontal direction. In this case, the subperiods are arranged in the vertical direction.

The YOGO chart 200 in the present embodiment is divided into multiple horizontal areas by multiple separation lines 201. The horizontal areas are given serial numbers (hereafter, actuator numbers) starting with number 1. Each actuator included in the pipe bender 10 is assigned to any one of the horizontal areas. In the example of FIG. 8, the actuator Ac10 (refer to FIG. 3) is assigned to the area with the actuator number 1. The actuator Ac11 (refer to FIG. 3) is assigned to the area with the actuator number 2. The actuator Ac12 (refer to FIG. 3) is assigned to the area with the actuator number 3. The pipe bender 10 in the present embodiment includes the ten actuators Ac10 to Ac19 each assigned with a horizontal area.

The element action of each of the actuators Ac10 to Ac19 is written at an appropriate position in the horizontal area assigned with the actuator. To cause the actuator Ac10 to perform its element action in the subperiod 4, for example, an element action 206 to be performed by the actuator Ac10 is written at the coordinate position of the square identified by the subperiod number 4 in the horizontal area with the actuator number 1 on the YOGO chart 200. To cause the actuator Ac10 to perform its element action in the subperiod 4 and the subperiod 8, the element action 206 to be performed by the actuator Ac10 is written at the coordinate position of the square identified by the subperiod number 4 in the horizontal area with the actuator number 1, and at the coordinate position of the square identified by the subperiod number 8 in the same horizontal area. The element action of the actuator Ac10 is thus written in the horizontal area with the actuator number 1 on the YOGO chart 200. The element action of the actuator Ac11 is written on the horizontal area with the actuator number 2. In this manner, the element action of each of the actuators Ac10 to Ac19 is written in the horizontal area assigned with the actuator on the YOGO chart 200.

The engineer can thus visually determine the subperiods for which the actuators Ac10 to Ac19 are to act and easily obtain the number of times each actuator acts simply by viewing the horizontal areas corresponding to the actuators Ac10 to Ac19. The engineer can, for example, easily notice any actuator yet to return to its original position or any actuator with its action undescribed. This avoids errors in information written on the YOGO chart 200.

The YOGO chart 200 in the present embodiment describes the element actions as described below. In one example, the element action 206 of the actuator Ac13 that acts first on the YOGO chart 200 of FIG. 8 will now be described. The actuator Ac13, which acts first, corresponds to the actuator number 4 and the subperiod number 1. The element action is thus written at the coordinate position of the square with the actuator number 4 and the subperiod number 1 on the YOGO chart 200. The square corresponding to the coordinate position with the subperiod number 1 is between the number-1 trigger line 202 on the left and the number-2 trigger line 202 on the right. An action line 203 indicating the action of the actuator is thus drawn from the number-1 trigger line 202 to the number-2 trigger line 202. The action line 203 has a start point 204 at the left end (thus on the number-1 trigger line 202) to indicate the start of the action. The action line 203 has an end point 205 at the right end (thus on the number-2 trigger line 202) to indicate the end of the action. In the example of FIG. 8, the action line 203 is a thick solid line, the start point 204 is an outlined circle, and the end point 205 is a solid circle.

The element action 206 to be performed by the actuator is written above the action line 203. The YOGO chart 200 in the present embodiment describes each element action 206 using two elements, an action identifier and a numerical table. In the example of FIG. 8, the two identifiers ($\Omega$-AC and AC-B11) are written above the action line 203 with the actuator number 4 and the subperiod number 1. $\Omega$-AC is an action identifier 206a. AC-B11 is a numerical table 206b. Although the action identifier 206a and the numerical table 206b will be described in more detail later, the action identifier 206a generally represents qualitative details (e.g., forward motion, backward motion, or rotation) of the element action 206, and the numerical table 206b generally includes numerical values representing the quantitative details (e.g., the movement distance, speed, or torque) of the element action 206.

On the YOGO chart 200 of FIG. 8, $\Omega$-AC and AC-B01 are at the coordinate position with the actuator number 4 and the subperiod number 1, showing that the actuator with the actuator number 4 (the actuator Ac13 in the example of FIG. 8) performs the element action in accordance with the action identifier 206a ($\Omega$-AC) at the time with the subperiod number 1 using the specific numerical values included in the numerical table 206b (AC-B01).

On the YOGO chart 200 of FIG. 8, the actuator Ac10 has the action identifier 206a ($\Omega$-AA), and the actuator Ac11 has the action identifier 206a ($\Omega$-AB). The actuators Ac10 and Ac11 have different action identifiers 206a. The actuator Ac10 opens and closes the chuck 12b, whereas the actuator Ac11 turns (or twists) the holder shaft 12a about its axis, as described above with reference to FIG. 3. More specifically, the actuator Ac10 has the element action with the action identifier 206a indicating an opening or closing motion, whereas the actuator Ac11 has the element action with the action identifier 206a indicating a rotation motion. The actuator Ac10 and the actuator Ac11 thus have different action identifiers 206a. Similarly, the actuator Ac11 and the actuator Ac12 have different action identifiers 206a.

In contrast, the actuator Ac12 and the actuator Ac13 have the same action identifier 206a ($\Omega$-AC). As described above with reference to FIG. 3, the actuator Ac12 axially moves the holder shaft 12a forward or backward. The actuator Ac13 moves the entire conveyor unit 12 forward or backward. The actuators Ac12 and Ac13 thus move objects having different sizes, weights, movement distances, or other parameters forward or backward. Thus, the actuator Ac12 and the actuator Ac13 have the same action identifier 206a. The actuator Ac16 vertically moves the entire machining unit 13. The vertical motion can be referred to as a forward or backward motion. The actuator Ac16 can thus have the same action identifier 206a ($\Omega$-AC) as the actuator Ac12 and the actuator Ac13. The actuators Ac14 and Ac15 are both air cylinders moving forward or backward and thus have the action identifier 206a ($\Omega$-CA).

The YOGO chart 200 in the present embodiment thus describes the element action 206 of each actuator (basically) using the action identifier 206a and the numerical table 206b. This allows the same action identifier 206a to be used for multiple actuators. Although the pipe bender 10 in the present embodiment includes the ten actuators Ac10 to Ac19 as shown in FIG. 3, the YOGO chart 200 describing the operation of the pipe bender 10 uses four action identifiers 206a.

FIG. 9 is a table showing the details of the action identifiers 206a used on the YOGO chart 200 in the present embodiment. The action identifier 206a ($\Omega$-AA) indicates the opening or closing motion to be performed by an actuator combining an alternating-current (AC) servomotor and a chuck unit. In other words, the action identifier 206a ($\Omega$-AA) cannot be used for an actuator that performs the opening or closing motion but is other than an actuator combining an AC servomotor and a chuck unit.

The action identifier 206a ($\Omega$-AA) indicates the opening or closing motion to be performed by an actuator combining an AC servomotor and a chuck unit. Such a simple action can be performed with a small program (or a program element) that can be pre-created. The action identifier 206a is stored in a manner associated with a serial number (hereafter, a program element number) for identifying the program element to perform the action. With the program element number stored in a manner associated with the action identifier 206a, the action identifier 206a ($\Omega$-AA) cannot be used for an actuator that performs the opening or closing motion but is other than an actuator combining an AC servomotor and a chuck unit. In other words, actuators with different structures may use different program elements to operate. The action identifiers 206a associated with such different program elements are thus also different.

As shown in FIG. 9, the action identifier 206a (Ω-AB) indicates the rotation motion to be performed by an actuator combining an AC servomotor and a reducer. The action identifier 206a (Ω-AB) is stored in a manner associated with the program element number 7. The action identifier 206a (Ω-AC) indicates the forward or backward motion to be performed by an actuator combining an AC servomotor and a ball screw unit. The action identifier 206a (Ω-AC) is stored in a manner associated with the program element number 4. The action identifier 206a (Ω-CA) indicates the forward or backward motion to be performed by an actuator being an air cylinder. The action identifier 206a (Ω-CA) is stored in a manner associated with the program element number 2. The number-2 program element is a simple element to cause the air cylinder to open or close its ports. Such an action can be performed with a simpler method (e.g., using a relay, a logic circuit, or sequence control). However, the program element can be used to perform the simple action to allow the simple control for the air cylinder to be processed in the same manner as the other complex control for the AC servomotor.

The action identifiers 206a simply qualitatively indicate actions such as the opening or closing motion, the rotation motion, or the forward or backward motion. The action identifiers 206a are basically combined with the numerical tables 206b. On the YOGO chart 200 described above with reference to FIG. 8, for example, the actuator Ac10 with the actuator number 1 has the action identifier 206a (Ω-AA). For the numerical table 206b, the actuator Ac10 has the numerical table 206b (AA-B01) at the time with the subperiod number 4, the numerical table 206b (AA-B02) at the time with the subperiod number 6, and the numerical table 206b (AA-B01) at the time with the subperiod number 10. The identifier AA-B01 herein refers to B01 as the numerical table 206b combined with Ω-AA as the action identifier 206a. The identifier AA-B02 herein refers to B02 as the numerical table 206b combined with Ω-AA as the action identifier 206a.

FIGS. 10A and 10B are example numerical tables 206b each combined with the action identifier 206a (Ω-AA). FIG. 10A is the numerical table 206b (AA-B01). FIG. 10B is the numerical table 206b (AA-B02). Although FIGS. 10A and 10B are two example numerical tables 206b, more numerical tables 206b may be used. The numerical tables 206b illustrated in FIGS. 10A and 10B each include three fields: the numerical table number, the opening-closing speed, and the opening-closing load. The numerical table number is the serial number of the numerical table 206b. For example, the numerical table 206b (AA-B01) of FIG. 10A is identified in response to the numerical table number 5 being specified. The numerical table 206b (AA-B02) of FIG. 10B is identified in response to the numerical table number 6 being specified.

Of the three fields in the numerical tables 206b illustrated in FIGS. 10A and 10B, the two fields, the opening-closing speed and the opening-closing load, are used to describe the element actions 206 in combination with the action identifier 206a. The numerical tables 206b are combined with the action identifier 206a (Ω-AA) indicating the opening or closing motion, and thus include the two fields, the opening-closing speed and the opening-closing load. The action identifier 206a (Ω-AA) alone simply qualitatively indicates the opening or closing motion without the quantitative details such as the speed or load for the opening or closing motion. The numerical tables 206b thus include the opening-closing speed field and the opening-closing load field storing numerical values. In the opening-closing speed field in the numerical tables 206b, a positive numerical value indicates a closing motion (refer to FIG. 10A), and a negative numerical value indicates an opening motion (refer to FIG. 10B).

On the YOGO chart 200 described above with reference to FIG. 8, the actuator Ac11 with the actuator number 2 has one action identifier 206a (Ω-AB). The actuator Ac11 also has the numerical table 206b (AB-B01) at the time with the subperiod number 2, and the numerical table 206b (AB-B02) at the time with the subperiod number 8. The identifier AB-B01 refers to B01 as the numerical table 206b combined with Ω-AB as the action identifier 206a. The identifier AB-B02 refers to B02 as the numerical table 206b combined with Ω-AB as the action identifier 206a.

FIGS. 11A and 11B are example numerical tables 206b each combined with the action identifier 206a (Ω-AB). FIG. 11A is the numerical table 206b (AB-B01). FIG. 11B is the numerical table 206b (AB-B02). Although FIGS. 11A and 11B are two example numerical tables 206b, more numerical tables 206b may be used. The numerical tables 206b illustrated in FIGS. 11A and 11B each include four fields: the numerical table number as well as the rotation angle, the rotation speed, and the torque. Of these fields, the rotation angle, the rotation speed, and the torque are used to describe the element actions in combination with the action identifier 206a. The numerical tables 206b of FIGS. 11A and 11B are combined with the action identifier 206a (Ω-AB) indicating the rotation motion, and thus include the rotation angle, the rotation speed, and the torque. The action identifier 206a (Ω-AB) alone simply indicates the rotation motion without the details about the angle, speed, or torque of the rotation. The numerical tables 206b thus include numerical values for the rotation angle, the rotation speed, and the torque. The rotation angle in the numerical tables 206b may be a positive numerical value or a negative numerical value. The different signs, plus and minus, indicate opposite rotation directions.

On the YOGO chart 200 of FIG. 8, the actuator Ac12 with the actuator number 3, the actuator Ac13 with the actuator number 4, and the actuator Ac16 with the actuator number 7 have the same action identifier 206a (Ω-AC) but different numerical tables 206b. More specifically, the actuator Ac12 with the actuator number 3 has the numerical table 206b (AC-B01) or (AC-B02), the actuator Ac13 with the actuator number 4 has the numerical table 206b (AC-B11) or (AC-B12), and the actuator Ac16 with the actuator number 7 has the numerical table 206b (AC-B21) or (AC-B22). The identifiers AC-B01, AC-B02, AC-B11, AC-B12, AC-B21, and AC-B22 herein respectively refer to B01, B02, B11, B12, B21, and B22 as the numerical tables 206b each combined with Ω-AC as the action identifier 206a. These predetermined numerical tables 206b also include the fields corresponding to the action identifiers 206a, similarly to the numerical table 206b described with reference to FIG. 10A, 10B, 11A, or 11B.

The actuator Ac17 with the actuator number 8 has the action identifier 206a (Ω-AD) and the numerical table 206b (AD-B01) or (AD-B02). These predetermined numerical tables 206b also include the fields corresponding to the action identifiers 206a.

On the YOGO chart 200 of FIG. 8, the actuator Ac14 with the actuator number 5 and the actuator 15 with the actuator number 6 both have the action identifier 206a (Ω-CA). This corresponds to the actuators Ac14 and Ac15 both being air cylinders with the forward or backward motion as the element actions. The action identifier 206a (Ω-CA) is not combined with any numerical table 206b. More specifically, the actuators Ac14 and Ac15, which are air cylinders switching between two operation ports for air pressure, have no quantitative numerical value representing their action details.

As described above in detail, the YOGO chart 200 in the present embodiment describes each element action 206 at the coordinate position identified by the subperiod number and the actuator number to indicate the actuator to perform the element action and the timing of the element action. Each element action 206 is basically indicated by the combination of the action identifier 206a and the numerical table 206b. For creating the YOGO chart 200, the engineer may focus on selecting the action identifiers 206a and may tentatively determine the numerical tables 206b. The work of writing the action identifiers 206a on the YOGO chart 200 is thus substantially the same as the work of intuitively expressing the engineer's idea. This greatly reduces errors in information written on the YOGO chart 200.

C-2. Overview of Control Program Generation Apparatus 110

Once the YOGO chart 200 described above is created, the control program can be automatically generated from the YOGO chart 200 by the control program generation apparatus 110 (refer to FIG. 1) included in the central control apparatus 100.

Figure 12:
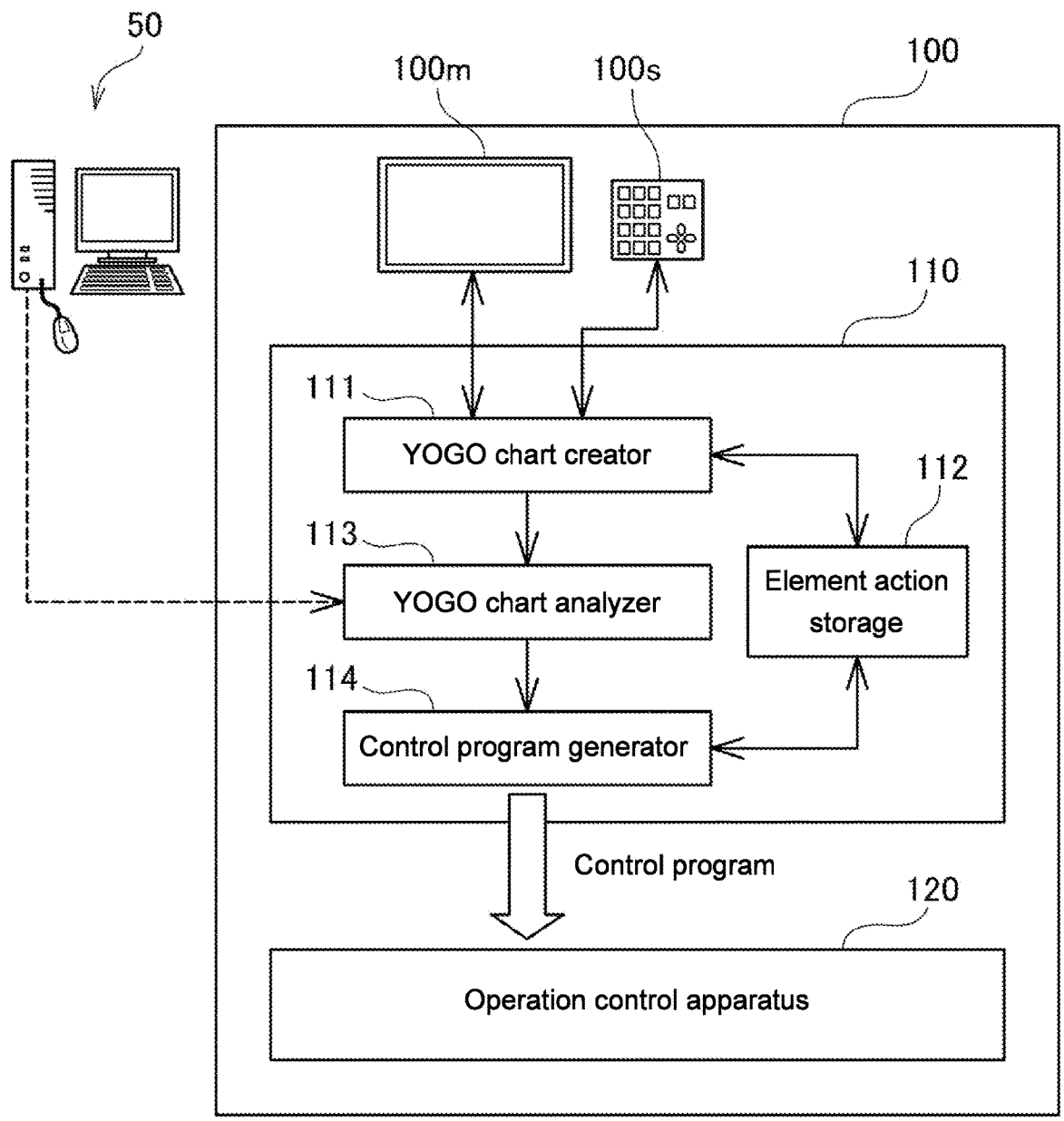
FIG. 12 is a diagram of a control program generation apparatus 110 included in a central control apparatus 100.

FIG. 12 is a diagram of the control program generation apparatus 110 included in a central control apparatus 100. As shown in FIG. 12, the control program generation apparatus 110 according to the present embodiment includes a YOGO chart creator 111, an element action storage 112, a YOGO chart analyzer 113, and a control program generator 114. These units are conceptual representations of multiple functions to be included in the control program generation apparatus 110 to create the YOGO chart 200 and to generate the control program. The control program generation apparatus 110 thus may not be a combination of components corresponding to these units. These units can be implemented in various forms, such as a program executable by a central processing unit (CPU), an electronic circuit combining integrated circuit (IC) chips and large-scale integrated (LSI) circuits, or a combination of these.

The YOGO chart creator 111 is connected to, for example, a monitor screen 100m and operation buttons 100s. A mechanical engineer with knowledge about the automated manufacturing machine (the pipe bender 10 or the robotic arm 20 or 30) creates the YOGO chart 200 as illustrated in FIG. 8 by using the operation buttons 100s while viewing the monitor screen 100m. Any engineer with knowledge about the operation of the automated manufacturing machine can easily create the YOGO chart 200.

In the present embodiment, each element action is written on the YOGO chart 200 basically using the action identifier 206a and the numerical table 206b. The usable action identifier 206a depends on the actuator (refer to FIG. 9). The element action storage 112 prestores, in a manner associated with each other, the names of the actuators and the action identifiers 206a usable for the actuators.

FIG. 13 is a table including the names of the actuators in a manner associated with the usable action identifiers 206a. The element action storage 112 stores the correspondences between the names of the actuators and the usable action identifiers 206a. As shown in the figure, the element action storage 112 stores the action identifiers 206a usable for actuators in a manner associated with the actuators. The element action storage 112 also stores program element numbers in a manner associated with the action identifiers 206a. As described above, the program element number herein refers to the number identifying the program element to cause the actuator to perform the action indicated by the action identifier 206a. For each of the actuator Ac17 and the actuator Ac18, for example, two action identifiers 206a indicating different actions are selectable. The element action storage 112 stores the program element numbers for the respective action identifiers 206a. The element action storage 112 also stores the structures of the actuators and the details of the element actions of the actuators in a manner associated with the actuators. The element action storage 112 also stores the numerical tables 206b illustrated in FIGS. 10A to 11B.

The above element action storage 112 is connected to the YOGO chart creator 111. The mechanical engineer can thus refer to the element action storage 112 for creating the YOGO chart 200. Any mechanical engineer with sufficient knowledge about the pipe bender 10 knows the types of actuators and the manner of acting of the actuators. The mechanical engineer can thus select appropriate action identifiers 206a from the usable action identifiers 206a for the actuators. For numerical tables 206b, tentative numerical tables 206b may be prepared. As described above with reference to FIG. 10A, 10B, 11A, or 11B, the numerical tables 206b each have a name combining a serial number with a predetermined portion of the name of the corresponding action identifier 206a. The engineer may thus tentatively determine and write the names of the numerical tables 206b on the YOGO chart 200 and later correct numerical values in the numerical tables 206b or change the numerical tables 206b. In response to a numerical table 206b with a new name being created, the numerical table 206b is automatically assigned with a new numerical table number (refer to FIGS. 10A to 11B).

The YOGO chart analyzer 113 reads and analyzes the YOGO chart 200 created by the YOGO chart creator 111 to generate intermediate data, and outputs the intermediate data to the control program generator 114. The process for generating the intermediate data from the YOGO chart will be described in detail later. In some embodiments, the YOGO chart analyzer 113 may read and analyze the YOGO chart 200 created with a computer 50 separated from the central control apparatus 100, instead of being created by the YOGO chart creator 111 in the control program generation apparatus 110.

Upon receiving the intermediate data, the control program generator 114 refers to the correspondences stored in the element action storage 112 to generate the control program from the intermediate data. The process for generating the control program from the intermediate data will be described in detail later. The control program generator 114 then outputs the resultant control program to the operation control apparatus 120.

Figure 14:
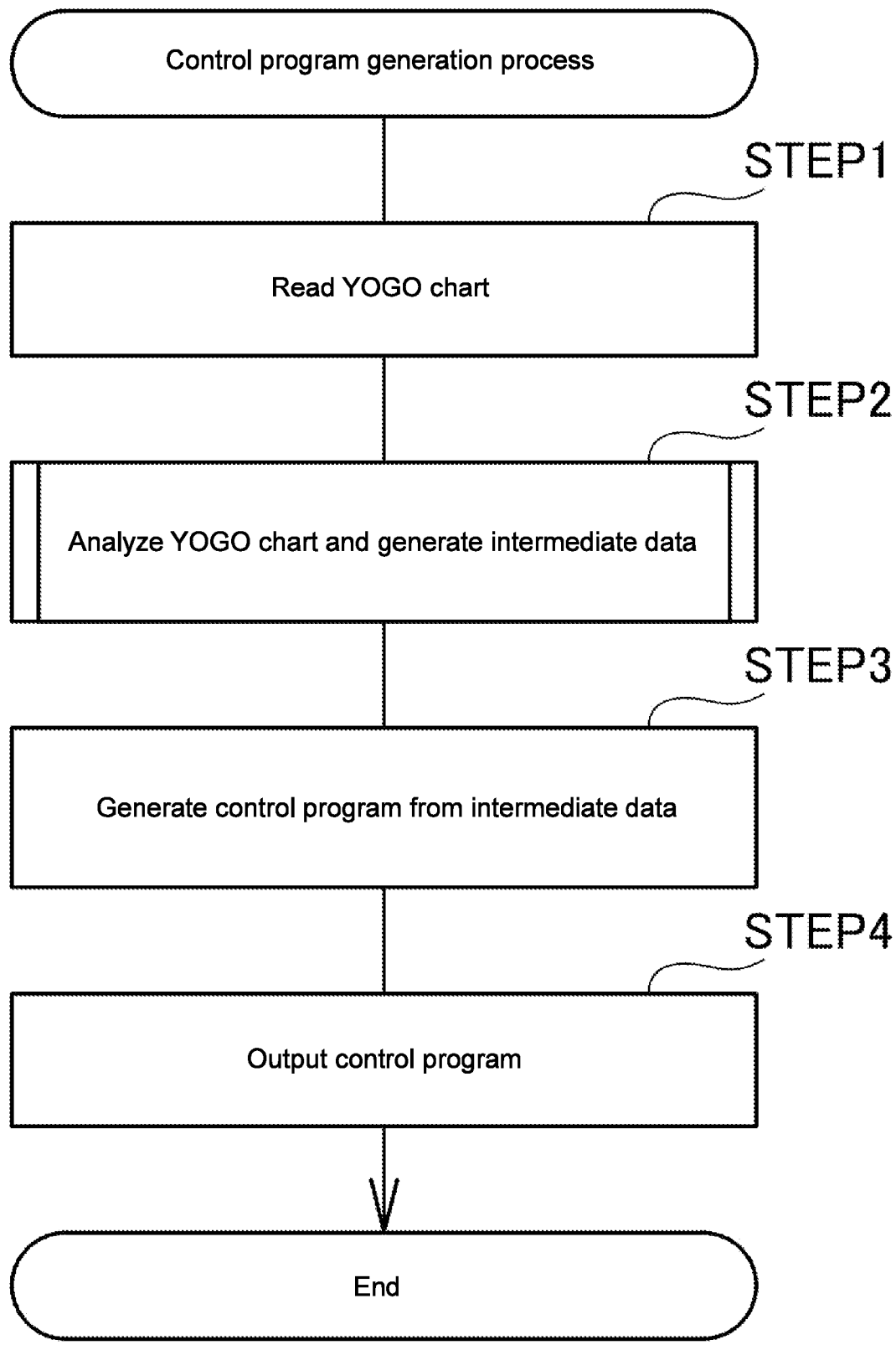
FIG. 14 is a flowchart of a control program generation process for generating the control program from the YOGO chart 200 performed by the control program generation apparatus 110.

FIG. 14 is a general flowchart of the control program generation process performed by the above control program generation apparatus 110. In the control program generation process, as shown in the figure, the YOGO chart is read first (STEP 1). The read YOGO chart is then analyzed to generate intermediate data (STEP 2).

Figure 15:
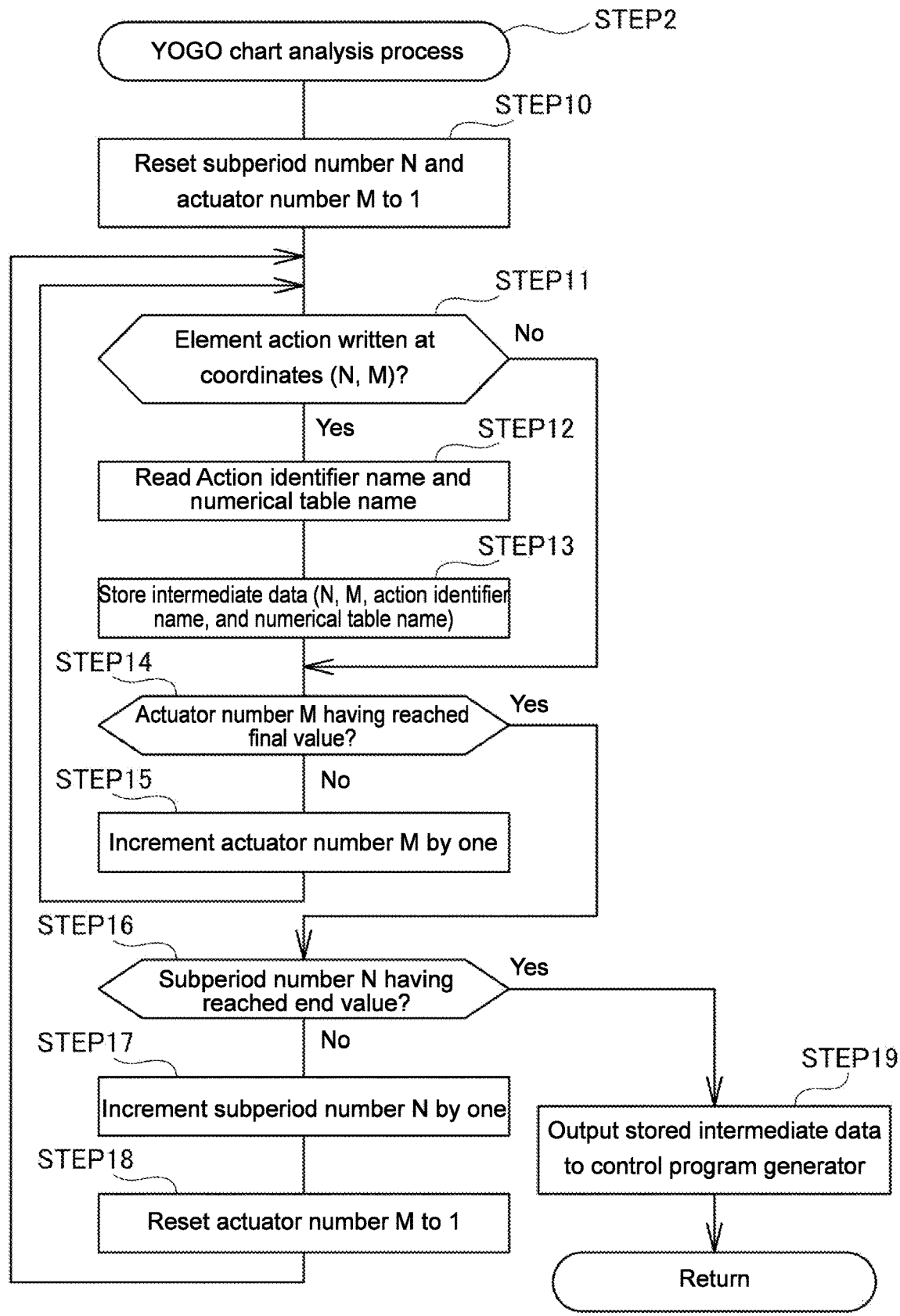
FIG. 15 is a flowchart of a YOGO chart analysis process performed in the control program generation process.

FIG. 15 is a flowchart of the process (YOGO chart analysis process) for analyzing the YOGO chart and generating the intermediate data performed by the YOGO chart analyzer 113 in the control program generation apparatus 110. At the start of the YOGO chart analysis process, As illustrated, the subperiod number N and the actuator number M are each reset to 1 (STEP 10). The determination is performed as to whether an element action is written at the coordinates (N, M) on the YOGO chart (STEP 11). The coordinates (N, M) on the YOGO chart herein refer to the coordinate position of the square identified by the combination of the subperiod number N and the actuator number M on the YOGO chart. Immediately after STEP 10 in which the subperiod number N and the actuator number M are reset, N and M are both 1. Thus, the determination is performed as to whether an element action is written at the coordinates (1, 1) on the YOGO chart.

For the YOGO chart of FIG. 8, no element action is written at the coordinates (1, 1), and the determination result in STEP 11 is negative. The determination is then performed as to whether the actuator number M has reached the final value (STEP 14). The final value for the actuator number M is 10, with the ten actuators Ac10 to Ac19 being included in the pipe bender 10 in the present embodiment. For the determination in STEP 14 as to whether an element action is written at the coordinates (1, 1), the determination result is negative. The actuator number M is then incremented by one (STEP 15). The actuator number M after the increment is used to determine again whether an element action is written at the coordinate position (N, M) (STEP 11).

For every increment, by one, of the actuator number M with the subperiod number N fixed to 1, the determination is performed as to whether an element action is written at the coordinates (1, M) in the above manner. In response to the coordinates (1, M) with a written element action being reached, the determination result in STEP 11 is affirmative.

In response to the determination result in STEP 11 being affirmative, the action identifier 206a and any numerical table 206b for the element action written at the coordinates are read (STEP 12). For the YOGO chart 200 of FIG. 8, in response to the coordinates (1, 4) being reached, the determination result in STEP 11 is affirmative. This causes the action identifier 206a (Ω-AC) and the numerical table 206b (AC-B11) to be readable as the element action.

Data, or hereafter intermediate data (N, M, the action identifier, and the numerical table), is then stored in a memory (STEP 13). The data includes the coordinates (N, M), the action identifier 206a, and the numerical table 206b for the read element action. For the coordinates (1, 4) on the YOGO chart of FIG. 8, the intermediate data (1, 4, Ω-AC, AC-B11) is stored in the memory. The intermediate data indicates that the element action 206 is written at the position identified by the subperiod number 1 and the actuator number M being 4 on the YOGO chart, and also indicates that the element action 206 is identified by the action identifier 206a (Ω-AC) and the numerical table 206b (AC-B11).

The intermediate data read from the YOGO chart 200 is stored in the memory (STEP 13). The determination is then performed as to whether the actuator number M has reached the final value (10 in this example) (STEP 14). In response to the actuator number M being yet to reach the final value (no in STEP 14), the actuator number M is incremented by one (STEP 15), and the process returns to STEP 11 to determine again whether an element action is written at the coordinates (N, M) on the YOGO chart 200.

In response to the actuator number M reaching the final value (yes in STEP 14), the determination is performed as to whether the subperiod number N has reached an end value (STEP 16). For the YOGO chart describing the operation of the pipe bender 10 using 100 subperiods, for example, the subperiod number N has the end value of 100.

In response to the subperiod number N being yet to reach the end value (no in STEP 16), the subperiod number N is incremented by one (STEP 17), the actuator number M is reset to 1 (STEP 18), and the process returns to STEP 11 to determine again whether an element action is written at the coordinates (N, M) on the YOGO chart 200. More specifically, the determination is performed for the subperiod with the subperiod number N being 1 from top to bottom on the YOGO chart 200 (refer to FIG. 8), then for the subperiod with the subperiod number N being 2 from top, and then for the subperiod with the subperiod number N being 3. In this manner, the element actions written on the YOGO chart 200 are read in sequence from the subperiod with a lower subperiod number N to the subperiod with a higher subperiod number N. The read element actions are stored as intermediate data in the memory.

In response to the subperiod number N finally being determined to have reached the end value (yes in STEP 16) after the repeated processes above, the element actions written on the YOGO chart 200 have been all read. The intermediate data stored in the memory is then read and output to the control program generator 114 (STEP 19).

Figures 16, 17:
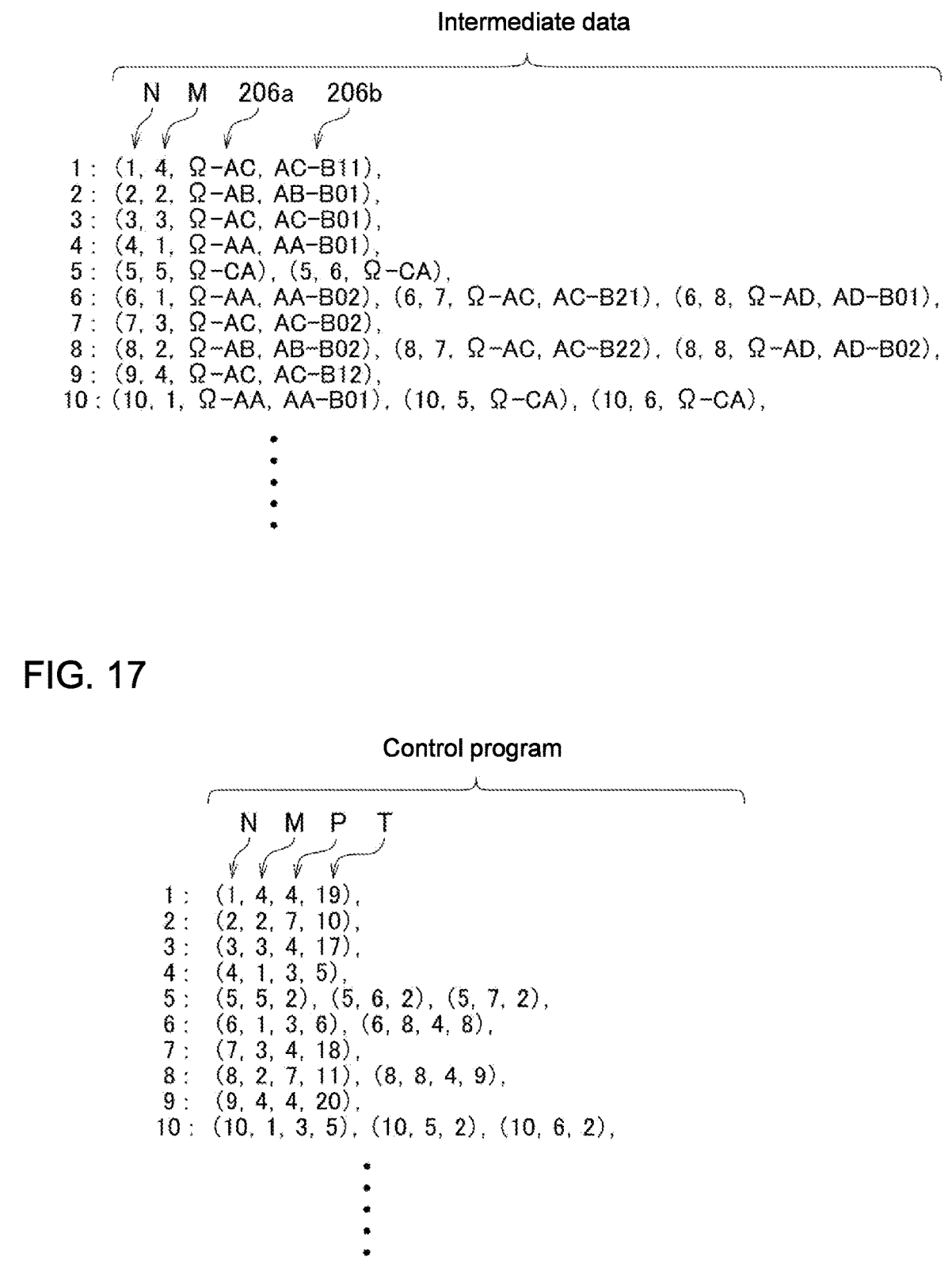

FIG. 16 illustrates the intermediate data resulting from analyzing the YOGO chart 200 of FIG. 8. As illustrated, the intermediate data is a collection of sets of data (hereafter, data records) each including the subperiod number N, the actuator number M, the action identifier 206a, and the numerical table 206b listed in this order. The subperiod number N in each data record can take any value from 1 to the end value of the subperiod number N. The actuator number M can take any actuator number written on the YOGO chart 200. Every subperiod number N on the YOGO chart 200 is included in any data record. Every actuator number M on the YOGO chart 200 is included in any data record. In response to the intermediate data being output, the YOGO chart analysis process in FIG. 16 is complete, and the process returns to the control program generation process in FIG. 15.

In the control program generation process shown in FIG. 15, the control program is generated based on the intermediate data obtained as described above (STEP 3). FIG. 17 shows the control program generated from the intermediate data illustrated in FIG. 16. As illustrated, the control program is a collection of sets of data (hereafter, data records) each including the subperiod number N, the actuator number M, the program element number P, and the numerical table number T listed in this order. The comparison between the intermediate data in FIG. 16 and the control program in FIG. 17 shows that the control program corresponds to the intermediate data. However, the action identifiers 206a in the data records in the intermediate data are replaced with the corresponding program element numbers P (refer to FIG. 13). The numerical tables 206b in the data records in the intermediate data are replaced with the corresponding numerical table numbers T of the numerical tables 206b (refer to FIGS. 10A to 11B).

The action identifiers 206a and the numerical tables 206b in the intermediate data are replaced with the program element numbers and the numerical table numbers by the control program generator 114 in FIG. 12 referring to the element action storage 112. The element action storage 112 stores the action identifiers 206a and the program element numbers in a manner associated with each other (refer to FIG. 13). The element action storage 112 also stores the numerical tables 206b illustrated in FIGS. 10A to 11B each including the numerical table number. The control program generator 114 replaces the action identifiers 206a and the numerical tables 206b in the intermediate data with the program element numbers and the numerical table numbers by referring to the correspondences in FIG. 13 and the numerical tables 206b of FIGS. 10A to 11B stored in the element action storage 112.

In response to the control program being generated from the intermediate data (STEP 3 in FIG. 15), the generated control program is output to the operation control apparatus 120 included in the central control apparatus 100 (STEP 4), and the control program generation process in FIG. 15 is complete. The operation control apparatus 120 according to the present embodiment controls the operation of the automated manufacturing machine (the pipe bender 10 or the robotic arm 20 or 30) in accordance with the control program.

D. Method for Controlling Operation of Automated Manufacturing Machine Performed by Operation Control Apparatus 120

D-1. Internal Structure of Operation Control Apparatus 120

Figure 18:
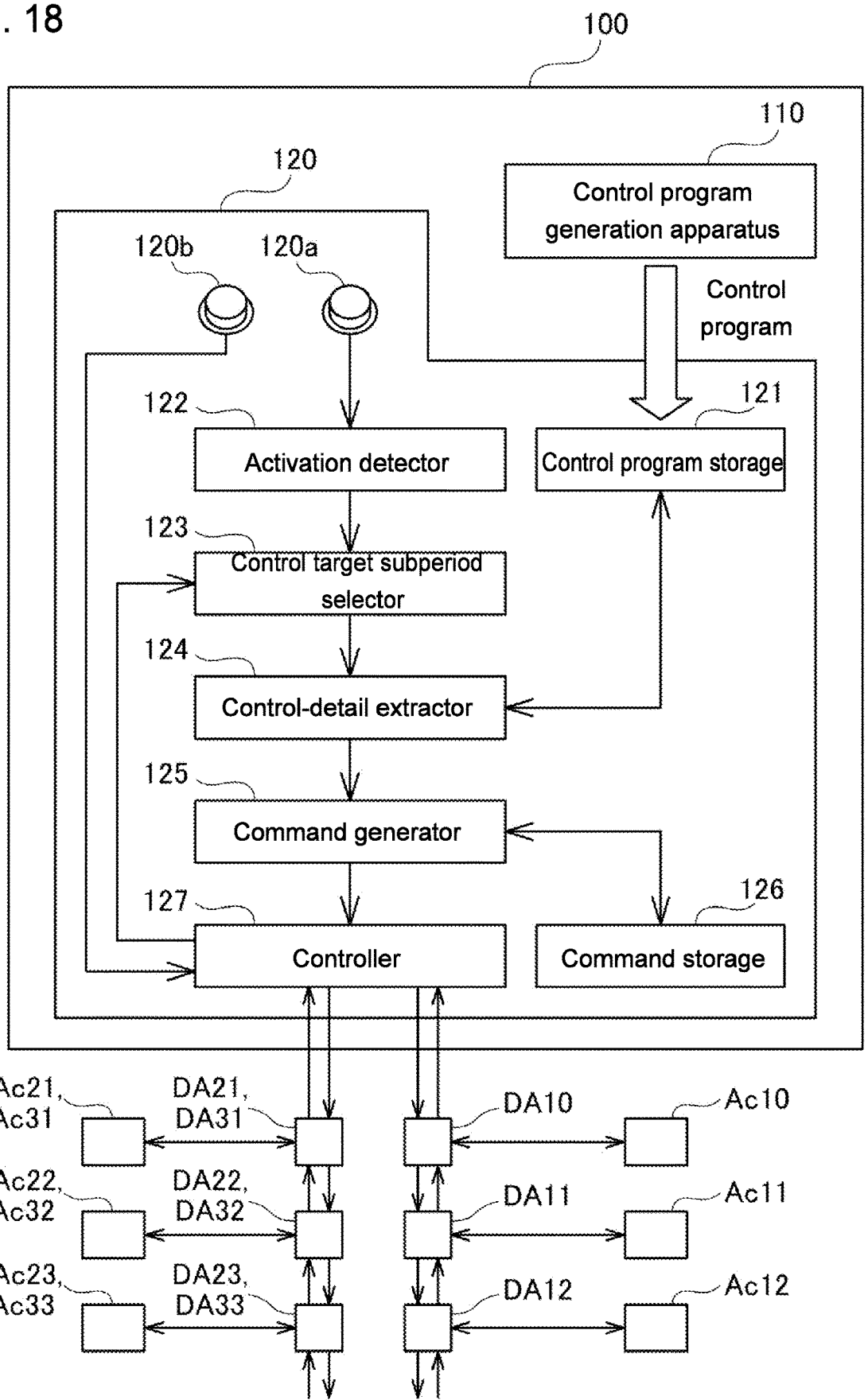
FIG. 18 is a diagram of the operation control apparatus 120 according to the present embodiment included in the central control apparatus 100.

FIG. 18 is a diagram of the operation control apparatus 120 according to the present embodiment. As illustrated, the operation control apparatus 120 includes a control program storage 121, an activation detector 122, a control target subperiod selector 123, a control-detail extractor 124, a command generator 125, a command storage 126, and a controller 127. These units are conceptual representations of multiple functions included the operation control apparatus 120 to control the actions of the actuators in accordance with the control program. The operation control apparatus 120 thus may not be a combination of components corresponding to these units. These units can be implemented in various forms, such as a program executable by the CPU, an electronic circuit combining IC chips and LSI circuits, or a combination of these.

The control program storage 121 prestores the control program generated by the control program generation apparatus 110. The activation detector 122 is connected to an activation switch 120a in the central control apparatus 100, detects the activation switch 120a being pressed, and outputs the information to the control target subperiod selector 123.

The control target subperiod selector 123 receives the information about the activation switch 120a being pressed, selects the first subperiod on the YOGO chart as the subperiod for which control is performed (hereafter, a control target subperiod), and outputs the subperiod number of the subperiod to the control-detail extractor 124.

The control-detail extractor 124 is connected to the control program storage 121, receives the subperiod number of the control target subperiod, and extracts the data record having the subperiod number of the control target subperiod from the control program stored in the control program storage 121. As described above, the data record includes the actuator number M, the program element number P, and the numerical table number T as well as the subperiod number N. The actuator number M indicates the actuator to be controlled. The program element number P indicates the program element to be used to control the actuator. The numerical table number T indicates the numerical table including numerical values to be used to control the actuator. The combination of the program element and the numerical table represents specific control details (in other words, action information for control). Extracting the data record with the subperiod number of the control target subperiod from the control program refers to extracting the actuator to be controlled and the control details for the actuator. The control-detail extractor 124 outputs the extracted actuator and control details to the command generator 125. The control-detail extractor 124 may extract multiple data records and output the actuator and the control details for each data record to the command generator 125.

The command generator 125 receives the actuator to be controlled in the control target subperiod and the control details for the actuator, generates a command corresponding to the details, and outputs a command with the specified actuator to the controller 127. Although the method for generating the command will be described in more detail later, the command storage 126 stores the correspondences between the program element numbers P and commands. Upon receiving the control details, the command generator 125 refers to the command storage 126 using the program element number P included in the control details to generate the command. For multiple actuators to be controlled in the control target subperiod, the command is generated for each actuator and is output to the controller 127.

The controller 127 is connected to the driver amplifiers DA10 to DA19, the driver amplifiers DA21 to DA27, and the driver amplifiers DA31 to DA37. The driver amplifiers DA10 to DA19 are connected to the actuators Ac10 to Ac19 in the pipe bender 10. The driver amplifiers DA21 to DA27 are connected to the actuators Ac21 to Ac27 in the robotic arm 20. The driver amplifiers DA31 to DA37 are connected to the actuators Ac31 to Ac37 in the robotic arm 30. Upon receiving a command with the specified actuator, the controller 127 performs feedback control by driving the driver amplifier corresponding to the specified actuator to cause the actuator to perform the element action corresponding to the command. This process will be described in detail later. For multiple actuators to be controlled, the feedback control is performed for each actuator.

Upon detecting all the actuators completing the element actions, the controller 127 outputs, to the control target subperiod selector 123, information indicating that the control for the control target subperiod is complete. The control target subperiod selector 123 then selects the subperiod subsequent to the subperiod selected as the previous control target subperiod, and outputs the subperiod number N of the newly selected control target subperiod to the control-detail extractor 124. The control-detail extractor 124 extracts the control details for the newly selected control target subperiod in the above manner, and outputs the results to the command generator 125. The command generator 125 receives the results, generates the command, and outputs the command to the controller 127. The controller 127 then starts controlling actuators for the newly selected control target subperiod in accordance with the command. The central control apparatus 100 includes a stop switch 120b to be pressed to cause the controller 127 to stop the control. As described above, the operation control apparatus 120 according to the present embodiment sequentially selects the subperiods one by one from the first subperiod to the final subperiod to control the actions of the actuators included in the automated manufacturing machine.

D-2. Operation Control Process Performed by Operation Control Apparatus 120

Figure 19:
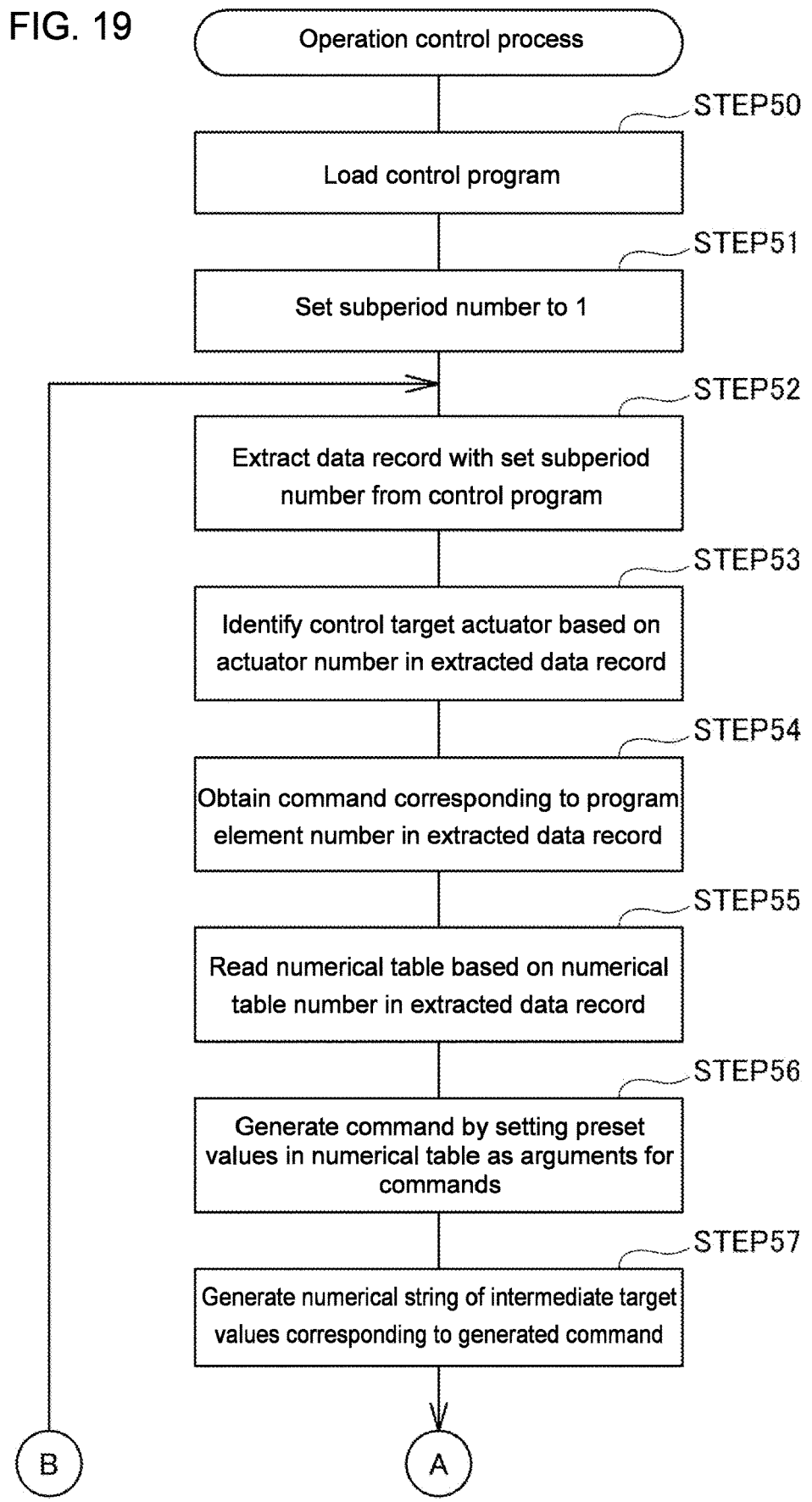
FIG. 19 is a flowchart of the first half of an operation control process for controlling the operation of the automated manufacturing machine in accordance with the control program performed by the operation control apparatus 120 according to the present embodiment.

FIG. 19 is a flowchart of an operation control process performed by the operation control apparatus 120 according to the present embodiment for controlling the actions of the actuators included in the automated manufacturing machine. At the start of the operation control process, as shown in FIG. 19, the control program stored in the control program storage 121 is loaded first (STEP 50). The subperiod number N is set to 1 (STEP 51). The data record with the set subperiod number N is extracted from the control program (STEP 52). In the case of the control program including multiple data records with the set subperiod number N, all the data records are extracted. At the start of the operation control process, the subperiod number N is set to 1. The data record (1, 4, 4, 19) is thus extracted from the control program illustrated in FIG. 17.

The actuator to be controlled is then identified based on the actuator number M in the extracted data record (STEP 53). For the data record read in STEP 52 being (1, 4, 4, 19), the second value 4 in the data record is the actuator number M, indicating that the actuator with the actuator number M being 4 is to be controlled. In the case of multiple data records being read in STEP 52, the respective actuators to be controlled are identified based on the actuator numbers M in the data records.

The program element number P in the read data record is read, and the command corresponding to the program element number P is obtained (STEP 54). The command is obtained by referring to the correspondences between program element numbers P and commands prestored in the command storage 126 in the operation control apparatus 120 shown in FIG. 18.

FIG. 21 is an example table including the correspondences between program element numbers P and commands stored in the command storage 126 in the operation control apparatus 120. For example, the program element number 1 is associated with a command with a command name ACMTR_OC_wT that causes an AC servomotor to perform an opening or closing motion. For example, the program element number 3 is associated with a command with a command name ACMTR_OC_woT that also causes an AC servomotor to perform an opening or closing motion. The command ACMTR_OC_wT and the command ACMTR_OC_woT differ from each other in that the time of the opening or closing motion is specified or is not specified. More specifically, the command ACMTR_OC_wT causes the opening or closing motion to be performed for a predetermined time, whereas the command ACMTR_OC_woT causes the opening or closing motion without specifying the time. The program element number 2 is associated with a command with a command name ARCYL_OC that also causes an air cylinder to perform an opening or closing motion. In STEP 54 in the operation control process shown in FIG. 19, the command corresponding to the program element number P is obtained by referring to the correspondences in FIG. 21.

As shown in FIG. 21, each command has a command name for which an argument is to be set. For the command ACMTR_OC_wT corresponding to the program element number 1, for example, three arguments are to be set. The first argument is set to 0 indicating an opening motion or 1 indicating a closing motion. For the second argument, the opening-closing degree is set for the opening or closing motion. For the third argument, the time of the opening or closing motion is set. In other words, generating the command includes setting arguments for the command in addition to obtaining the command name.

In the operation control process in FIG. 19, the numerical table number T stored in the data record is obtained, and the numerical table 206b corresponding to the numerical table number T is read (STEP 55). The numerical table 206b is also prestored in the command storage 126 in the operation control apparatus 120. As described above with reference to FIG. 10A, 10B, 11A, or 11B, the numerical table 206b prestores various values. The command is then generated by setting the values included in the read numerical table 206b as arguments for the obtained command (STEP 56).

The command may not have any argument. As shown in FIG. 21, for example, the command ARCYL_OC corresponding to the program element number 2 has no argument. The data record thus may not include any numerical table number T. For example, the data record including the program element number P being 2 includes no numerical table number T. When the data record extracted in STEP 52 in FIG. 19 includes no numerical table number, reading of the numerical table 206b in STEP 55 or setting of arguments for the command in STEP 56 is eliminated.

A numerical string of intermediate target values corresponding to the generated command is then generated (STEP 57). FIGS. 22A to 22C are graphs and a diagram showing a numerical string of intermediate target values generated in accordance with a command. FIGS. 22A to 22C show an example for the command with a command name ACMTR_FR_woT (specifically, a command to cause an actuator to move forward or backward by a specified distance without the time of movement specified, as shown in FIG. 21) with a movement distance Dt specified. Without the time specified, the actuator moves in a reference drive pattern shown in FIG. 22A. More specifically, the actuator accelerates from a stopped state to a predetermined standard speed Ss over a predetermined acceleration time Tac, and then moves (forward or backward) at the constant standard speed Ss. In response to the movement distance approaching the movement distance Dt specified by the argument, the actuator decelerates from the standard speed Ss to 0 over a predetermined deceleration time Tdc. The drive time of the actuator, or time Tt, is determined by the movement distance Dt specified by the argument.

FIG. 22B is a graph showing the actuator moving with time while being driven in the drive pattern shown in FIG. 22A. As shown in FIG. 22B, the movement distance of the actuator reaches the movement distance Dt specified by the argument after the elapse of the time Tt from the start of driving of the actuator. In response to the command with the command name ACMTR_FR_woT with the specified movement distance Dt (without the time specified), the position of the actuator may be controlled as shown in FIG. 22B.

The change in the position of the actuator is pre-calculated at a predetermined time interval dT. More specifically, a movement distance D1 is calculated for the time point at which the time dT elapses from the start of the driving. A movement distance D2 is calculated for the time point at which the time dT further elapses. A movement distance D3 is calculated for the time point at which the time dT further elapses. In this manner, the position of the actuator is calculated for every elapse of the predetermined time dT. The numerical string shown in FIG. 22C can thus be obtained. The numerical string is a numerical string of intermediate target values corresponding to the command and indicating the target positions to which the actuator is to move with time.

The above numerical string of intermediate target values is generated in accordance with the command generated in STEP 56 in FIG. 19. FIGS. 22A to 22C show an example numerical string generated with the command with the command name ACMTR_FR_woT. For a command with a command name ACMTR_FR_wT (specifically, a command to cause an actuator to move forward or backward by a specified distance with the specified time of movement, as shown in FIG. 21), the numerical string shown in FIG. 23C is generated.

The arguments for the command may include a time Tc shorter than the time Tt taken for the movement in FIGS. 22A to 22C, and also include the same movement distance as the movement distance Dt in FIGS. 22A to 22C. In this case, the time of movement exceeds the time Tc at the standard speed Ss shown in FIG. 22A. As shown in FIG. 23A, the actuator accelerates to a movement speed Sc higher than the standard speed Ss. The rate of the acceleration may be the same rate as in the standard drive pattern shown in FIG. 22A. The actuator then moves (forward or backward) at the constant movement speed Sc. In response to the movement distance approaching the specified movement distance Dt, the movement speed Sc is reduced to 0. The rate of the deceleration may also be the same rate as in the standard drive pattern shown in FIG. 22A.

FIG. 23B is a graph showing the actuator moving with time while being driven in the drive pattern shown in FIG. 23A. The change in the position of the actuator can be calculated at the predetermined time interval dT to determine the numerical string of intermediate target values shown in FIG. 23C. The above movement distance Dt corresponds to an action target value in one or more aspects of the present invention. The numerical string of intermediate target values corresponds to an intermediate action in one or more aspects of the present invention. The numerical string of intermediate target values is generated based on the movement distance Dt and the command. The command is determined by each action identifier 206a on the YOGO chart 200. In the present embodiment, each action identifier 206a corresponds to information for generating the intermediate action in one or more aspects of the present invention.

In STEP 57 in FIG. 19, the numerical string of intermediate target values corresponding to the command is thus generated. The process for generating the numerical string of intermediate target values is performed by the controller 127 in the operation control apparatus 120 shown in FIG. 18.

Figure 20:
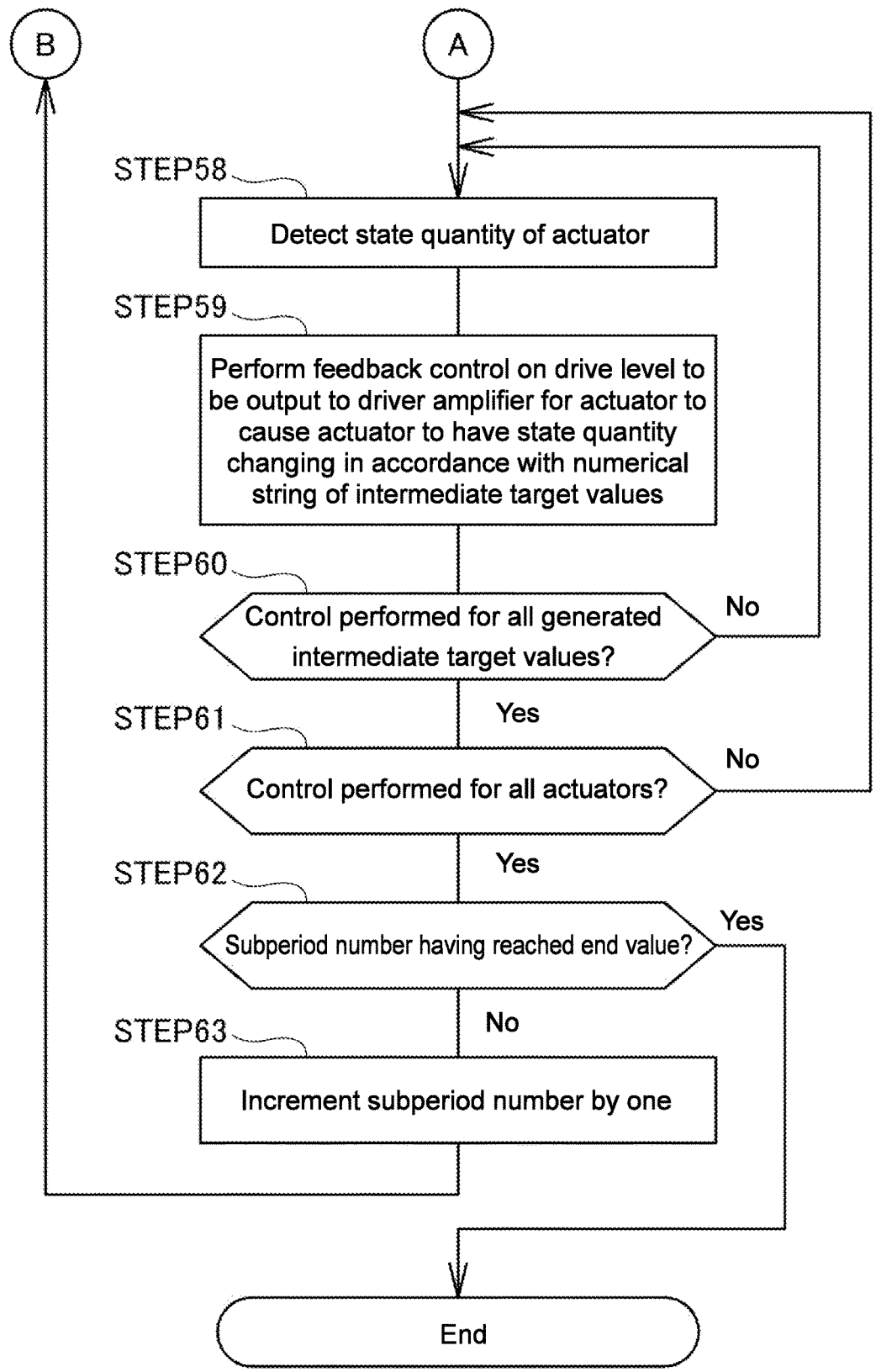
FIG. 20 is a flowchart of the second half of the operation control process.

The controller 127 in the operation control apparatus 120 then detects a state quantity of the actuator to be controlled (STEP 58 in FIG. 20). The state quantity of the actuator is a physical quantity determined by the motion to be performed by the actuator. The state quantity may be the movement distance for a forward or backward motion to be performed by the actuator, and may be the rotation angle for a rotation motion to be performed by the actuator. The state quantity may be the opening-closing degree for an opening or closing motion to be performed by the actuator. The state quantity of the actuator may also be the movement speed or the rotation speed. As described above with reference to FIG. 2 or 4, the actuators Ac10 to Ac19, Ac21 to Ac27, and Ac31 to Ac37 incorporate sensors such as encoders. The controller 127 in the operation control apparatus 120 can obtain the outputs from the sensors with the driver amplifiers DA10 to DA19, DA21 to DA27, and DA31 to DA37 to detect the state quantities of the actuators.

Feedback control is then performed on the drive level to be output to the driver amplifier DA for the actuator to cause the actuator to have the detected state quantity changing in accordance with the numerical string of intermediate target values (STEP 59). More specifically, after the elapse of the predetermined time dT from the start of driving of the actuator, the first intermediate target value in the numerical string is read and compared with the state quantity of the actuator. The drive level to be output to the driver amplifier DA is adjusted to reduce the deviation between the intermediate target value and the state quantity of the actuator.

The determination is performed as to whether the feedback control has been performed for all the intermediate target values in the numerical string (STEP 60). At the completion of the feedback control on the read first intermediate target value in the numerical string, the feedback control has yet to be performed on all the intermediate target values. The determination result is thus negative in STEP 60, and the process returns to STEP 58 to detect the state quantity of the actuator after the elapse of the predetermined time dT. The second intermediate target value in the numerical string is then read and compared with the state quantity of the actuator. The drive level to be output to the driver amplifier DA is adjusted to reduce the deviation between the intermediate target value and the state quantity of the actuator (STEP 59). The determination is then performed as to whether the feedback control has been performed for all the intermediate target values in the numerical string (STEP 60). For multiple actuators to be controlled, the above processes (STEP 58 to STEP 60) are performed for all the actuators in parallel.

Upon completion of the feedback control on the final intermediate target value in the numerical string (STEP 59) through the repeated processes, the determination result is affirmative in STEP 60. The determination is performed as to whether the above feedback control has been performed for all the actuators (STEP 61). With any actuator yet to be controlled (no in STEP 61), the process returns to STEP 58 to repeat the above series of processes (STEP 58 to STEP 60) for the actuator yet to be controlled.

Upon completion of the above control for all the actuators (yes in STEP 61), the determination is performed as to whether the subperiod number N has reached the end value (STEP 62). The subperiod number N is a serial number given to each subperiod on the YOGO chart 200. For the YOGO chart 200 including 100 subperiods, the end value of the subperiod number N is 100. In response to the subperiod number N being yet to reach the end value (no in STEP 62), the subperiod number N is incremented by one (STEP 63) with the control program including unprocessed data records. The process returns to STEP 52 in FIG. 19 to extract the data record with the new subperiod number N from the control program. The subsequent series of processes (STEP 53 to STEP 62) are then repeated. The subperiod number N reaches the end value after the repeated processes. The determination result is affirmative in STEP 62, and the operation control process shown in FIGS. 19 and 20 is complete.

As described in detail above, the operation control apparatus 120 according to the present embodiment loads the control program including multiple data records with the subperiod numbers N. The operation control apparatus 120 extracts data records with the same subperiod number N (refer to STEP 52 in FIG. 19), and generates commands corresponding to the details of the extracted data records (refer to STEP 56). The operation control apparatus 120 generates a numerical string of intermediate target values corresponding to the command (refer to STEP 57) and performs feedback control on the action of the actuator (refer to STEP 58 to STEP 60 in FIG. 20). The data records in the control program are processed with interpretation (specifically, by interpretation for each data record with the same subperiod number N). This restricts the number of actuators controlled at the same time for an automated manufacturing machine including many actuators or for multiple automated manufacturing machines to be controlled. The control program can thus be executed at a speed sufficient for practical use without the operation control apparatus 120 having high processing capability.

The YOGO chart 200 including a subperiod with many actuators to act can be easily corrected to include actuators to act that are less than or equal in number to the assignable number, as described above with reference to FIGS. 6A to 6B or 7A to 7C. The control program generated from the corrected YOGO chart 200 includes data records with the same subperiod number N that are less than or equal in number to a predetermined number. This allows actuators less than or equal in number to a predetermined number to be controlled at the same time. The control program can thus be executed at a speed sufficient for practical use with the operation control apparatus 120 having ordinary processing capability.

E. Modifications

The above operation control apparatus 120 according to the present embodiment may be modified variously. Such modifications will now be described. The modifications described below include many components that are the same as those in the above embodiment. In the modifications, the same components as in the above embodiment are given the same reference signs and will not be described. The modifications will be described focusing on their differences from the above embodiment.

E-1. First Modification

In the operation control apparatus 120 according to the above embodiment, one of the multiple subperiods is selected as the control target subperiod. Upon completion of the element actions 206 of all the actuators assigned to the control target subperiod (yes in STEP 61 in FIG. 20), the subsequent subperiod is newly selected as a control target subperiod. However, the manufacturing system 1 (or the automated manufacturing machine) may be controlled to maximize the manufacturing efficiency (production per hour). In this case, a condition may be set for determining the element action 206 to be complete. In response to the condition being satisfied, the element action 206 may be determined to be complete (yes in STEP 61 in FIG. 20) to permit the subsequent subperiod to be newly selected as a control target subperiod.

For the YOGO chart 200 of FIG. 8, for example, the subperiod with the subperiod number 2 is assigned with the element action 206 of the actuator Ac11 alone. Upon completion of the element action 206 of the actuator Ac11, the element action 206 of the actuator Ac12 assigned to the subperiod with the subperiod number 3 starts. The actuator Ac11 has the element action 206 including the action identifier 206a (Ω-AB) and the numerical table 206b (AB-B01). The action identifier 206a (Ω-AB) indicates the rotation motion (refer to FIG. 9). In the example of FIG. 11A, the numerical table 206b (AB-B01) includes a value of 90 degrees as the target rotation angle for the rotation motion. This indicates that the actuator Ac11 completes its element action 206 and the subsequent actuator Ac12 starts its element action 206 in response to the actuator Ac11 having the rotation angle reaching 90 degrees.

As compared with the numerical table 206b of FIG. 11A, the numerical table 206b in the first modification illustrated in FIG. 24 additionally includes a subsequent-action permission position field. The element action 206 is determined to be complete before the actuator reaches a position corresponding to the numerical value in the rotation angle field in the numerical table 206b by a rotation angle corresponding to the numerical value in the subsequent-action permission position field. In the example of FIG. 24, the rotation angle field has a value of 90 degrees, and the subsequent-action permission position field has a value of −5 degrees. In response to the rotation angle of the actuator Ac11 reaching 85 degrees (=90−5), the element action 206 of the actuator Ac11 is determined to be complete to permit the subsequent actuator Ac12 to start its element action 206.

The subperiod selected as the control target subperiod described above is assigned with the element action 206 of one actuator. However, the subperiod selected as the control target subperiod may be assigned with the element actions 206 of multiple actuators. For the YOGO chart 200 of FIG. 8, for example, the subperiod with the subperiod number 6 is assigned with three element actions 206 of the actuator Ac10, the actuator Ac16, and the actuator Ac17. In this case, the three element actions 206 may each have the numerical table 206b additionally including the condition for determining the element action to be complete (or the subsequent-action permission position). In response to all the element actions 206 being complete or being determined to be complete, the element action 206 (of the actuator Ac12 in this example) assigned to the subsequent subperiod (with the subperiod number 7 in this example) starts.

This allows earlier start of the element action 206 assigned to the subsequent subperiod, reducing the time taken to complete the processing for all the subperiods. This increases the manufacturing efficiency of the manufacturing system 1.

E-2. Second Modification

In the operation control apparatus 120 according to the above embodiment, the controller 127 in the operation control apparatus 120 generates numerical strings of intermediate target values corresponding to commands and outputs the respective drive levels to the driver amplifiers for the actuators. Driver amplifiers for driving actuators are typically provided together with the actuators purchased from an actuator manufacturer. In addition to the driver amplifiers, control units (also referred to as motion controllers) for outputting numerical strings corresponding to the above intermediate target values from commands may also be provided from the actuator manufacturer. For the robotic arms 20 and 30, dedicated control units for driving actuators included in the robotic arms 20 and 30 may be provided. For such control units, an operation control apparatus 120 described below may be used.

Figure 25:
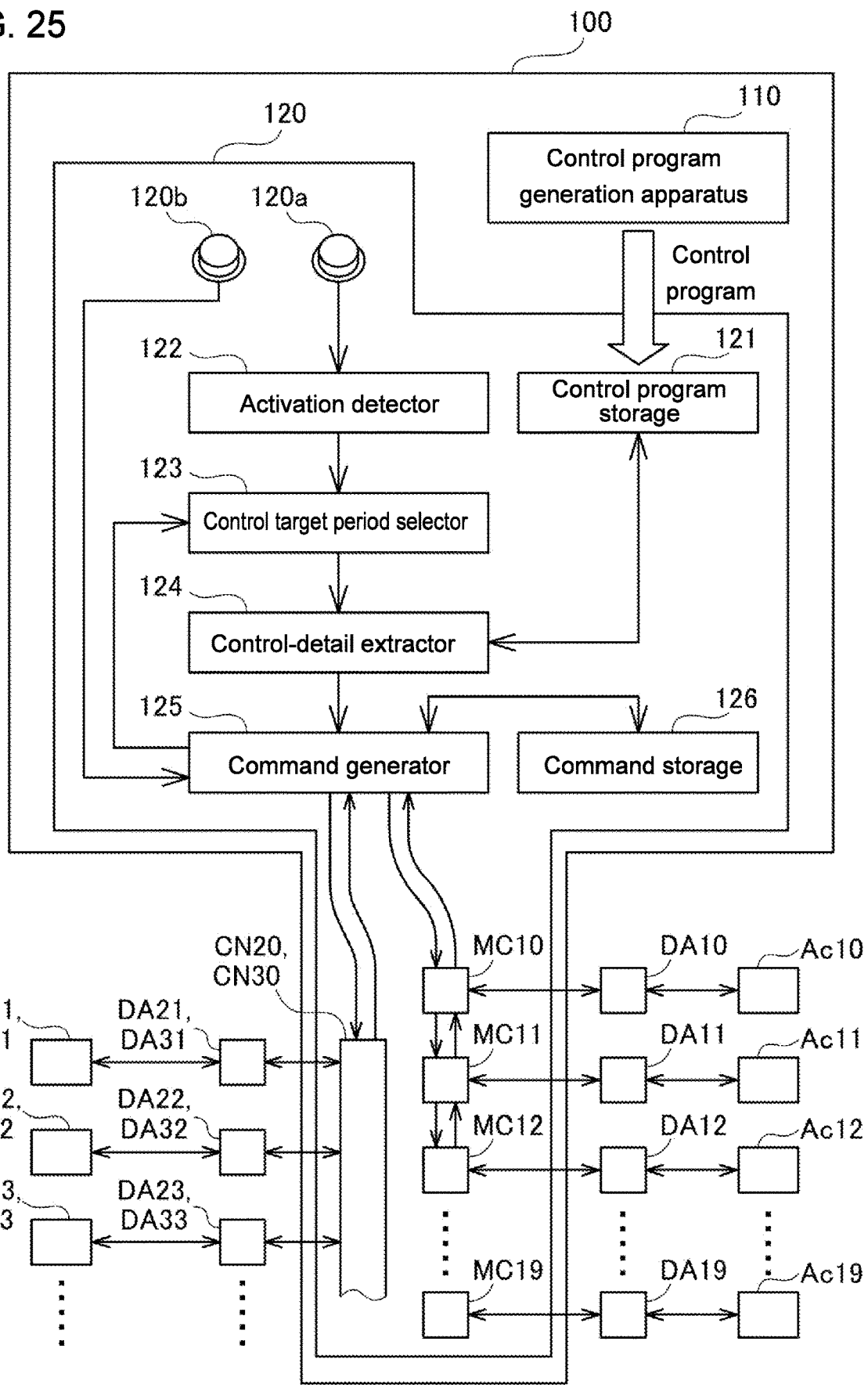
FIG. 25 is a diagram of an operation control apparatus 120 according to a second modification.

FIG. 25 is a diagram of the operation control apparatus 120 according to a second modification. As compared with the operation control apparatus 120 according to the above embodiment described with reference to FIG. 18, the operation control apparatus 120 according to the second modification in FIG. 25 includes control units MC10 to MC19 and control units CN20 and CN30 instead of the controller 127. A command generator 125 in the second modification generates commands and outputs the commands to the control units MC10 to MC19, which then control the actuators Ac10 to Ac19 with the driver amplifiers DA10 to DA19. For the actuators Ac21 to Ac27 and Ac31 to Ac37 included in the robotic arms 20 and 30, the command generator 125 generate commands and outputs the commands to the control units CN20 and CN30. The control units CN20 and CN30 then control the actions of the actuators Ac21 to Ac27 and Ac31 to Ac37 with the driver amplifiers DA21 to DA27 and DA31 to DA37.

The command generator 125 detects completion of the control on the actuators Ac10 to Ac19 with the control units MC10 to MC19, and detects completion of the control on the actuators Ac21 to Ac27 and Ac31 to Ac37 with the control units CN20 and CN30. Upon detecting completion of the control on all the operating actuators, the command generator 125 outputs such information to the control target subperiod selector 123, which then newly selects a control target subperiod. In the second modification in FIG. 25, the command generator 125 detects the stop switch 120b being pressed and outputs commands for stopping the control to the control units MC10 to MC19, CN20, and CN30.

The operation control apparatus 120 according to the second modification in FIG. 25 is similar to the operation control apparatus 120 according to the above embodiment described with reference to FIG. 18 except for the structure described above. The operation control apparatus 120 according to the second modification produces effects similar to those of the operation control apparatus 120 according to the above embodiment.

The operation control apparatuses 120 according to the present embodiment and modifications have been described. However, the present invention is not limited to the above embodiment and the modifications and may be implemented in various manners without departing from the spirit and scope of the invention.

REFERENCE SIGNS LIST 1 manufacturing system
10 pipe bender
11 rail
12 conveyor unit
12a holder shaft
12b chuck
13 machining unit
15 actuator
20 robotic arm
21 base
22 body
23 first arm
24 second arm
25 third arm
26 fourth arm
27 palm
28 gripper
30 robotic arm
31 base
32 body
33 first arm
34 second arm
35 third arm
36 fourth arm
37 palm
38 gripper
50 computer
100 central control apparatus
100m monitor screen
100s operation button
110 control program generation apparatus
112 element action storage
114 control program generator
120 operation control apparatus
120a activation switch
120b stop switch
121 control program storage
122 activation detector
123 control target subperiod selector
124 control-detail extractor
125 command generator
126 command storage
127 controller
201 separation line
202 trigger line
203 action line
204 start point
205 end point
206 element action
206a action identifier
206b numerical table
Ac10 to AC19, AC21 to Ac27, Ac31 to Ac37 actuator
CN20, CN30 control unit
DA10 to DA19, DA21 to DA27, DA31 to DA37 driver amplifier
MC10 to MC19 control unit

The invention claimed is:

1. An operation control apparatus for an automated manufacturing machine including a plurality of actuators, the operation control apparatus being configured to control an operation of the automated manufacturing machine by causing the plurality of actuators to act in accordance with a prestored control program, the apparatus comprising:
a control program storage storing operation data as the control program, the operation data describing the operation of the automated manufacturing machine, the operation data including a plurality of subperiods into which an operation period from a start to an end of the operation of the automated manufacturing machine is divided, each of the plurality of subperiods being assigned with an actuator of the plurality of actuators to act and action information about the actuator;
one or more processors configured to select one of the plurality of subperiods as a control target subperiod;
the one or more processors configured to extract, from the control program, a control target actuator being an actuator of the plurality of actuators to be controlled in the control target subperiod and control target action information being the action information about the control target actuator; and
a controller configured to perform feedback control on an action of the control target actuator to cause the control target actuator to act in accordance with the control target action information,
wherein upon completion of the feedback control on the control target actuator assigned to a current control target subperiod, the control target subperiod selector newly selects, as the control target subperiod, a subperiod of the plurality of subperiods subsequent to the current control target subperiod.

2. The operation control apparatus according to claim 1, wherein
the control program storage stores the control program including the plurality of subperiods each assigned with an actuator of the plurality of actuators less than or equal in number to a predetermined assignable number.

3. The operation control apparatus according to claim 1, wherein
the control program storage stores the control program including, as the action information about the actuator, an action target value for the actuator and information for generating an intermediate action before the action target value is reached, the control-detail extractor extracts, as the control target action information, the action target value and the information for generating the intermediate action, and the controller generates the intermediate action based on the action target value and the information for generating the intermediate action, and performs the feedback control on the action of the control target actuator to cause the control target actuator to reach the action target value through the intermediate action.

4. The operation control apparatus according to claim 3, wherein the controller calculates an intermediate target value at a predetermined time interval before the control target actuator reaches the action target value through the intermediate action, detects the action of the control target actuator at the predetermined time interval, and performs the feedback control on the action of the control target actuator to cause the action of the control target actuator to have a detection value matching the intermediate target value.

5. An operation control method for an operation control apparatus to control an operation of an automated manufacturing machine including a plurality of actuators, the operation control method being implementable to control the operation of the automated manufacturing machine by causing the plurality of actuators to act in accordance with a prestored control program, the method comprising:

loading the control program describing the operation of the automated manufacturing machine, the control program including a plurality of subperiods into which an operation period from a start to an end of the operation of the automated manufacturing machine is divided, each of the plurality of subperiods being assigned with an actuator of the plurality of actuators to act and action information about the actuator;

selecting one of the plurality of subperiods as a control target subperiod;

extracting, from the control program, a control target actuator being an actuator of the plurality of actuators to be controlled in the control target subperiod and control target action information being the action information about the control target actuator; and performing feedback control on an action of the control target actuator to cause the control target actuator to act in accordance with the control target action information, wherein the selecting the control target subperiod includes newly selecting, as the control target subperiod, a subperiod of the plurality of subperiods subsequent to a current control target subperiod upon completion of the feedback control on the control target actuator assigned to the current control target subperiod.

6. A non-transitory computer-readable storage medium storing a program for an operation control apparatus to control an operation of an automated manufacturing machine including a plurality of actuators, the program causing a computer included in the operation control apparatus to implement an operation control method to control the operation of the automated manufacturing machine by causing the plurality of actuators to act in accordance with a prestored control program, the program causing the computer to perform operations comprising:

loading the control program describing the operation of the automated manufacturing machine, the control program including a plurality of subperiods into which an operation period from a start to an end of the operation of the automated manufacturing machine is divided, each of the plurality of subperiods being assigned with an actuator of the plurality of actuators to act and action information of the actuator;

selecting one of the plurality of subperiods as a control target subperiod;

extracting, from the control program, a control target actuator being an actuator of the plurality of actuators to be controlled in the control target subperiod and control target action information being the action information about the control target actuator; and performing feedback control on an action of the control target actuator to cause the control target actuator to act in accordance with the control target action information, wherein the selecting the control target subperiod includes newly selecting, as the control target subperiod, a subperiod of the plurality of subperiods subsequent to a current control target subperiod upon completion of the feedback control on the control target actuator assigned to the current control target subperiod.

\* \* \* \* \*